June 20, 1950

T. A. WETZEL 2,511,956

TRACER CONTROLLED MACHINE TOOL

Filed Feb. 28, 1944

INVENTOR
THEODORE A. WETZEL
By W. D. O'Connor
ATTORNEY

INVENTOR
THEODORE A. WETZEL
BY W.Q. O'Connor
ATTORNEY

June 20, 1950 T. A. WETZEL 2,511,956
TRACER CONTROLLED MACHINE TOOL
Filed Feb. 28, 1944 5 Sheets-Sheet 5
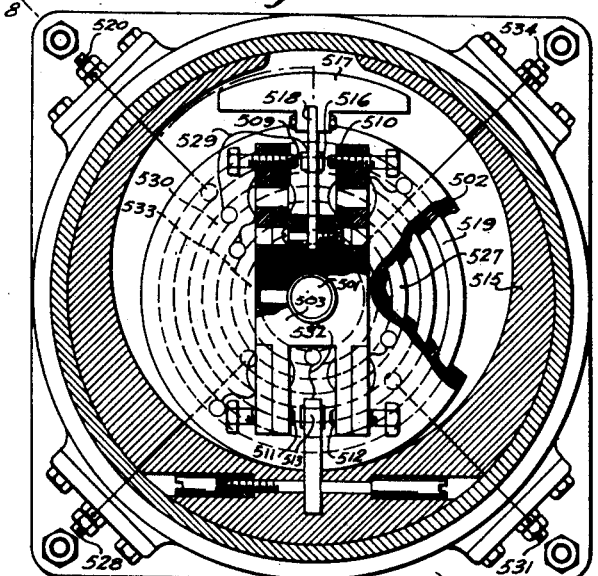
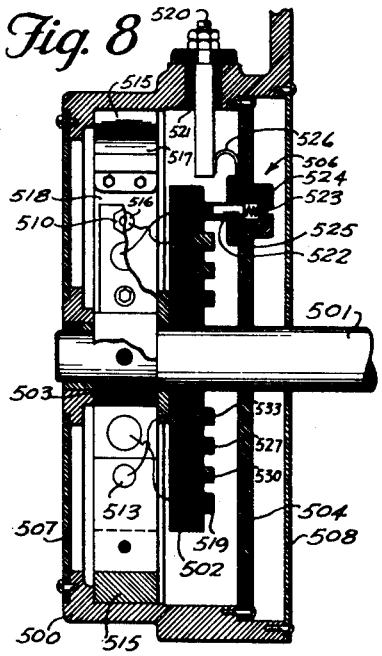
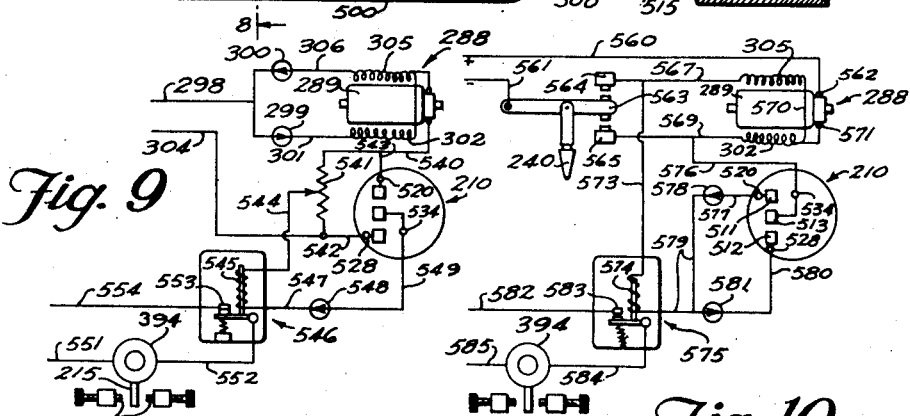
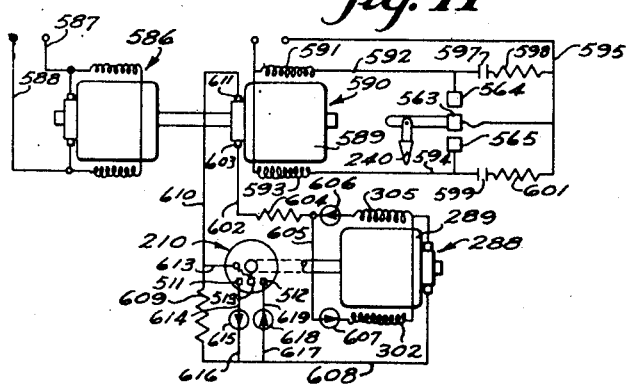
INVENTOR
THEODORE A. WETZEL
BY W. D. O'Connor
ATTORNEY Patented June 20, 1950

2,511,956

UNITED STATES PATENT OFFICE 2,511,956

TRACER CONTROLLED MACHINE TOOL

Theodore A. Wetzel, Milwaukee, Wis., assignor to Kearney & Trecker, West Allis, Wis., a corporation of Wisconsin Application February 28, 1944, Serial No. 524,162

25 Claims. (Cl. 318—162)

This invention relates, generally, to tracer controlled machine tools and more particularly to improved control systems for effecting operating movements of machine tool elements in response to guiding tracer mechanism.

A general object of the invention is to provide an improved actuating and controlling system for a tracer controlled machine tool.

Another object of the invention is to provide improved electrical operating and controlling apparatus for effecting movements of machine tool elements in accordance with a guiding pattern.

Another object is to provide an improved actuating and controlling mechanism for a tracer controlled machine tool in which control of machine movements is effected by reversing the polarity of the electric current that provides power for causing the machine movements.

Another object is to provide machine tool actuating and controlling mechanism in which a driving motor is provided with energy from a motor generator set, the output of which is controlled in accordance with the cutting action required.

Another object is to provide a tracer controlled machine tool in which a motor generator set provides actuating current for operating the machine, the output of the generator being controlled by electronic tubes arranged to respond to tracer mechanism.

Another object is to provide a tracer controlled machine tool in which a tracer system is arranged to act upon electronic tubes that control the excitation of a generator which provides electric current for effecting movements in accordance with the requirements of the tracer in following a guiding pattern.

Another object is to provide a tracer controlled machine in which actuating electric current for the machine is derived from a generator that is excited by an intermittent current, the frequency of interruption of the current being regulated by a tracer mechanism in accordance with the requirements of a guiding pattern.

Another object of the invention is to provide a tracer controlled machine tool in which the rate of change of movement of the machine elements functions to modify the controlling action of the tracer.

Another object is to provide in a tracer controlled machine tool, control means responsive to changes in the rate of movement of machine elements and arranged to react upon the controlling tracer mechanism selectively to accentuate or diminish the effect of the tracer in causing changes in movement of the machine elements.

Another object is to provide a tracer controlled machine tool in which control actions effecting deceleration of relative movement of machine elements are of greater magnitude than control actions effecting acceleration thereof, whereby a damping effect is provided to prevent hunting.

Another object is to provide a tracer controlled machine tool in which a brake is applied selectively to assist decelerating actions whereby overtravel of machine elements and hunting is prevented.

Another object is to provide an improved tracer controlled attachment for a standard milling machine having means for coordinating the movements of the milling machine table with those of the tracer controlled cutter spindle.

Another object is to provide a tracer controlled machine tool in which a tracer is arranged to effect movement of one element of an electronic tube, the tube being connected to control power means effecting relative movement of machine elements.

Another object is to provide a tracer controlled machine tool in which an electric motor for driving a cutter spindle is also connected to drive a generator that is controlled by tracer mechanism to furnish current for driving a spindle feeding motor in accordance with the requirements of a pattern being traced.

Another object is to provide a machine tool control system in which a saturable core transformer is arranged to provide current for effecting relative movements of machine elements, the degree of saturation of the transformer being controlled by tracer mechanism.

Another object is to provide an improved control system in which a controlled action occurs in accordance with the amount and direction of movement of a control member and a modifying effect depending upon the rate of the controlled action operates to change the influence of the control member in effecting the controlled action.

According to this invention a tracer controlled machine tool is arranged to be actuated by electric current of reversible polarity furnished from a generator, the output of which is regulated under the control of tracer mechanism. The generator may be driven by the spindle driving motor in the manner of a motor-generator set, a separate feeding motor being provided to effect the controlled feeding action through operation by current from the generator. The generator excitation field is under the control of tracer mechanism acting through electronic tubes and amplifiers in manner to provide current of either polarity for operating the feeding motor in either direction as required. The apparatus may be in the form of an attachment for a standard milling machine, in which event the feeding motor moves the cutter spindle and another motor is arranged to effect line feeding and cross feeding movement of the table, the two feeding motors being electrically interconnected in manner to provide inverse operation of the table feeding motor to maintain the resultant feeding rate substantially constant. The spindle carrying portion of the attachment may be pivotally mounted to provide for presenting the spindle at various angles to the work. According to one arrangement, the tracer actuates a movable condenser plate to unbalance a pair of electronic tubes that are connected through the amplifier to the control field of the generator, the arrangement being such that when the condenser element is moved in the one or the other direction, the generator is caused to generate electric current of one or the other polarity characteristic and of strength proportional to the deflection of the tracer. Accordingly, the tracer feeding motor is operated in the one or the other direction in accordance with the requirements of the tracer movements to effect the desired feeding action of the cutter spindle. The action of the feeding motor is modified by an electrical feedback arrangement which is responsive to changes in the rate of action upon the feeding motor and functions to modify the effect of the tracer control system. The feedback system may be adjusted selectively to function according to various modes of operation whereby the feedback effect results in accentuating or in diminishing the effect of the tracer system to a predetermined extent. To obviate oscillations in the feed drive, the decelerating action upon the feeding motor may be greater than the accelerating action, thereby preventing overrunning and providing a damping effect. As a further means for preventing overrunning, a brake associated with the spindle feeding motor is controlled in manner to be engaged during decelerating actions of the motor, both to prevent overrunning and to damp out oscillations. Instead of the spindle feeding motor being operated directly from the generator, the controlling effect may be accomplished by means of magnetic clutches actuated by the generator current. As another variation, the tracer may be arranged to regulate the frequency of vibration of contact points through which current flows to the generator excitation fields. A further modified type of control utilizes an electronic tube having a movable member actuated by the tracer. In place of the motor-generator set there may be substituted saturable core transformers that are controlled by the electronic tubes and that operate through rectifier elements to provide unidirectional currents of selected polarity to the spindle feeding motor.

The foregoing and other objects of this invention, which will become more fully apparent from the following description, may be achieved by means of the exemplifying apparatus depicted in and described in connection with the accompanying drawing in which:

Fig. 7 is a view partly in end elevation and partly in transverse section, of a direction and acceleration responsive switch that is associated with the feed driving mechanism, parts of the switch having been broken away to better show the interior;

Fig. 8 is a view in longitudinal section through the switch mechanism, taken along the line 8—8 in Fig. 7;

Fig. 9 is a schematic circuit diagram of part of the tracer controlled actuating circuit, showing an application of the switch shown in Figs. 7 and 8;

Fig. 10 is a schematic circuit diagram generally similar to Fig. 9 but showing another application of the direction and acceleration responsive switch; and Fig. 11 is still another similar schematic circuit diagram showing a further application of the direction and acceleration responsive switch.

The particular tracer controlled machine tool shown in the accompanying drawing as exemplifying a preferred embodiment of the present invention, is in the form of an attachment mounted on a milling machine of standard construction, although it is to be understood that the invention may be embodied with equal advantage in a unitary machine structure especially designed for performing tracing operations.

Figure 1:
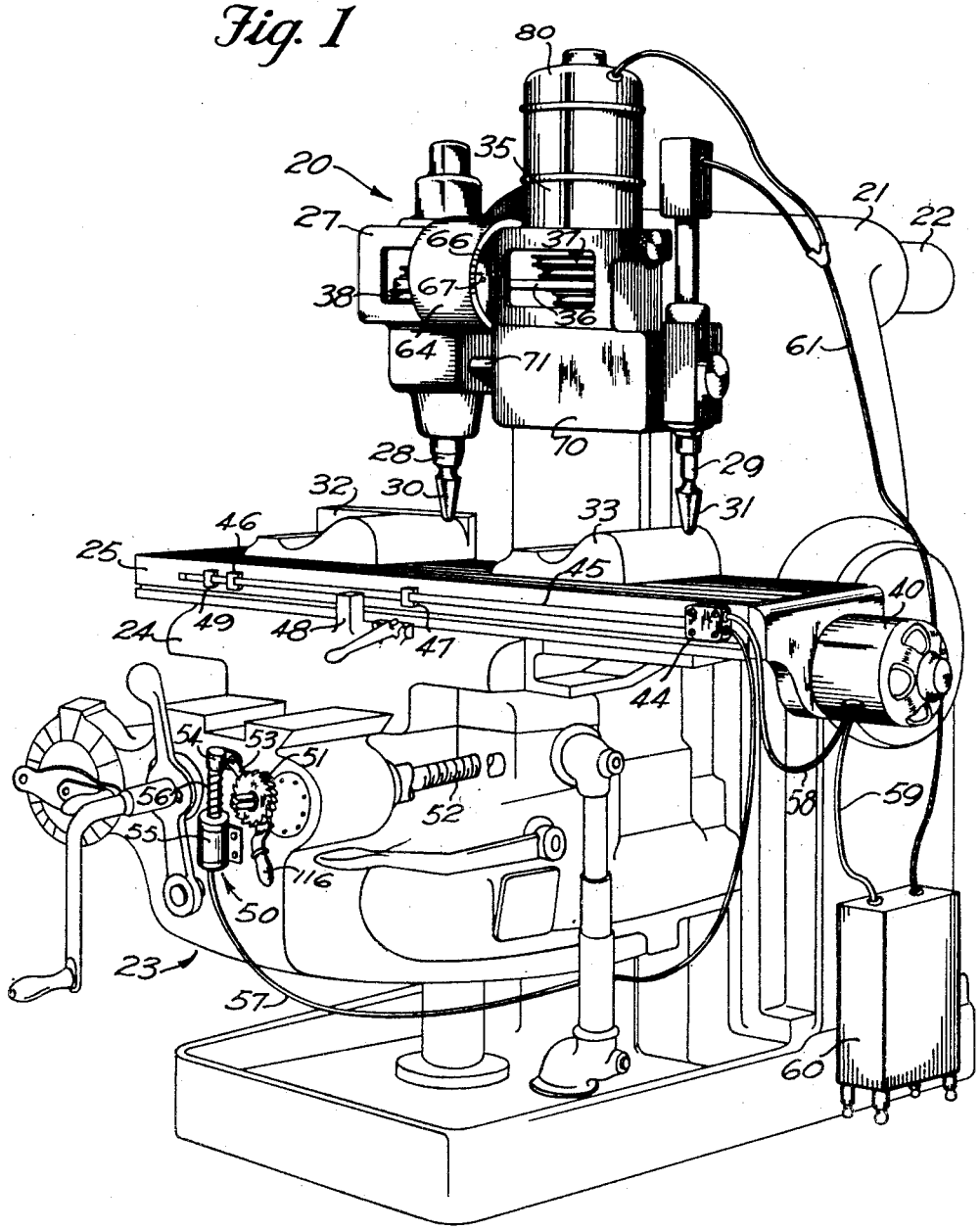
Figure 1 is a view in perspective of a milling machine of the standard knee and column type equipped with a tracer controlled milling attachment embodying the present invention.

Referring more specifically to the drawing, and particularly to Fig. 1 thereof, the illustrative apparatus there shown is embodied in an attachment 20 that is supported upon the upper forward part of a column 21 of a standard knee type milling machine by means of the usual overarms constituted by parallel round bars 22 that project from the front of the column in well known manner. The column 21 of the machine also supports the usual work holding elements including a vertically adjustable knee 23 that carries a saddle 24 slidably mounted on its upper surface for transverse movement toward or from the column. The saddle 24 in turn carries a work table 25 that is slidably mounted thereon for longitudinal feeding movement in the usual manner.

The tracing attachment 20 comprises a supporting frame 27 that presents a depending cutter spindle 28 and a parallelly disposed tracer sleeve 29, both arranged for vertical sliding movement in the frame. The spindle 28 and sleeve 29 are spaced sufficiently, in this case in direction of the longitudinal movement of the work table 25, to support a cutter 30 and a tracing point 31, respectively, for cooperation with a work piece 32 and a pattern 33 that may be clamped or otherwise secured in tandem relationship on the table.

The cutter spindle 28 is rotatably driven by means of a motor 35 mounted vertically at the top of the attachment frame 27 and operatively connected to the spindle by means of a V-belt 36 cooperating with a pair of complementary stepped pulleys 37 and 38, associated with the motor and the spindle, respectively. The stepped pulleys constitute a speed adjusting transmission mechanism, the motor being slidably mounted in the attachment frame 27 to provide for tightening the belt. When the machine is in operation, the cutter spindle 28 and its cutter 30 are adjusted in vertical direction automatically in response to the controlling action of the tracer point 31 in traversing the pattern 33, the tracer sleeve 29 being moved simultaneously with the spindle 28 in the manner of a follower mechanism.

In executing a copying operation, the table 25 is fed longitudinally back and forth in a line feeding movement, the saddle being fed transversely at each reversal of table movement to provide a cross feeding movement, the combination resulting in a series of closely spaced longitudinal cutting strokes that are controlled vertically by the tracer in accordance with the contour of the pattern being followed. Although the usual power feeding mechanism of the milling machine may be utilized for effecting the line feeding movement, it is preferable that the table be operated by a separate motor 40 that may be mounted on the end of the table as shown in Fig. 1. The table driving motor 40 is adapted to be interconnected electrically with the tracer controlled mechanism in manner to control the table rate. As shown diagrammatically in Fig. 2, the motor 40 is connected to a table driving screw 42 of the usual type by suitable gearing 43 in manner to rotate it in either direction selectively, the machine's usual power feed controlling clutch being preferably locked in disengaged position to avoid jamming of the mechanism through accidental engagement of both drives at once.

Control of the table feeding motor 40 to cause it to effect successive line feeding movements in opposite directions automatically is provided by means of a reversing limit switch 44 conveniently mounted on the front edge of the table 25 and arranged to be operated by a trip rod 45 slidably mounted for movement longitudinally of the table along its forward edge. The trip rod 45 is fitted with adjustably mounted stop dogs 46 and 47 disposed to engage an intermediate fixed abutment 48 carried by the saddle 24, the arrangement being such that when either of the dogs engages the abutment, the rod 45 is caused to move relative to the table 25 thereby actuating the switch 44 and causing the table motor 40 to reverse. The rod 45 is slidably mounted at its outer end in a lug 49 projecting from the table and the reversing dogs 46 and 47 are ordinarily positioned on the rod in manner to effect reversal of line movement when either extreme edge of the pattern 33 passes under the tracer point 31.

For effecting cross feeding of the saddle 24 at each point of reversal of the table 25, there is provided an electromagnetic jogger ratchet mechanism 50 that is mounted on the front of the knee 23. This mechanism comprises a ratchet wheel 51 that is connected to turn a screw shaft 52 constituting the usual saddle traversing screw. A cooperating pawl 53 is pivotally carried at the upper end of a vertically disposed slidably mounted armature plunger 54 in position to engage with the ratchet wheel 51. The armature plunger 54 is arranged to cooperate with an actuating solenoid 55 in such manner that when the solenoid is energized, the armature is drawn downward and the pawl 53 operates to turn the ratchet wheel 51 and the screw 52 a sufficient distance to effect the desired cross feeding movement. Return movement of the pawl 53 to its upper position after the solenoid has been de-energized, is effected by means of a coil spring 56 disposed to encircle the armature plunger 54 and arranged to exert force upwardly against an enlarged upper end of the plunger which also serves to pivotally carry the pawl 53.

The cross feed solenoid 55 receives energizing current from the reversing switch 44 through a flexible cable 57, the switch 44 being connected with the table driving motor 40 by a similar cable 58. Operation of the motor 40 is controlled through a cable 59 that connects with a control cabinet 60 that may be placed conveniently on the floor at the side of the machine, as shown in Fig. 1. The necessary connections from the control cabinet to the electrical apparatus of the attachment 20 is similarly effected through an appropriate flexible cable 61.

In order to provide for positioning the cutter 30 and the tracer point 31 angularly for tracing a pattern having an undercut portion at one side, the attachment 20 is mounted upon the supporting overarms 22 by means of a clamping arrangement which permits pivotal movement thereof about a horizontal axis parallel with the longitudinal axis of the table 25. This structure includes a hollow cylindrical clamping member 64 secured to the overarms and fitted about a complementary cylindrical portion of the supporting frame 27 constituting the body of the attachment and carrying the spindle and tracer together with their associated mechanism. A scale 66 on one end of the clamping member 64 may be read against a cooperating zero mark 67 on the frame 27 in adjusting the spindle 28 and tracer sleeve 29 to the desired angular position. After the adjustment has been completed, the clamping cylinder 64 may be tightened upon the frame 27 in well known manner to retain it against further movement.

Figure 2:
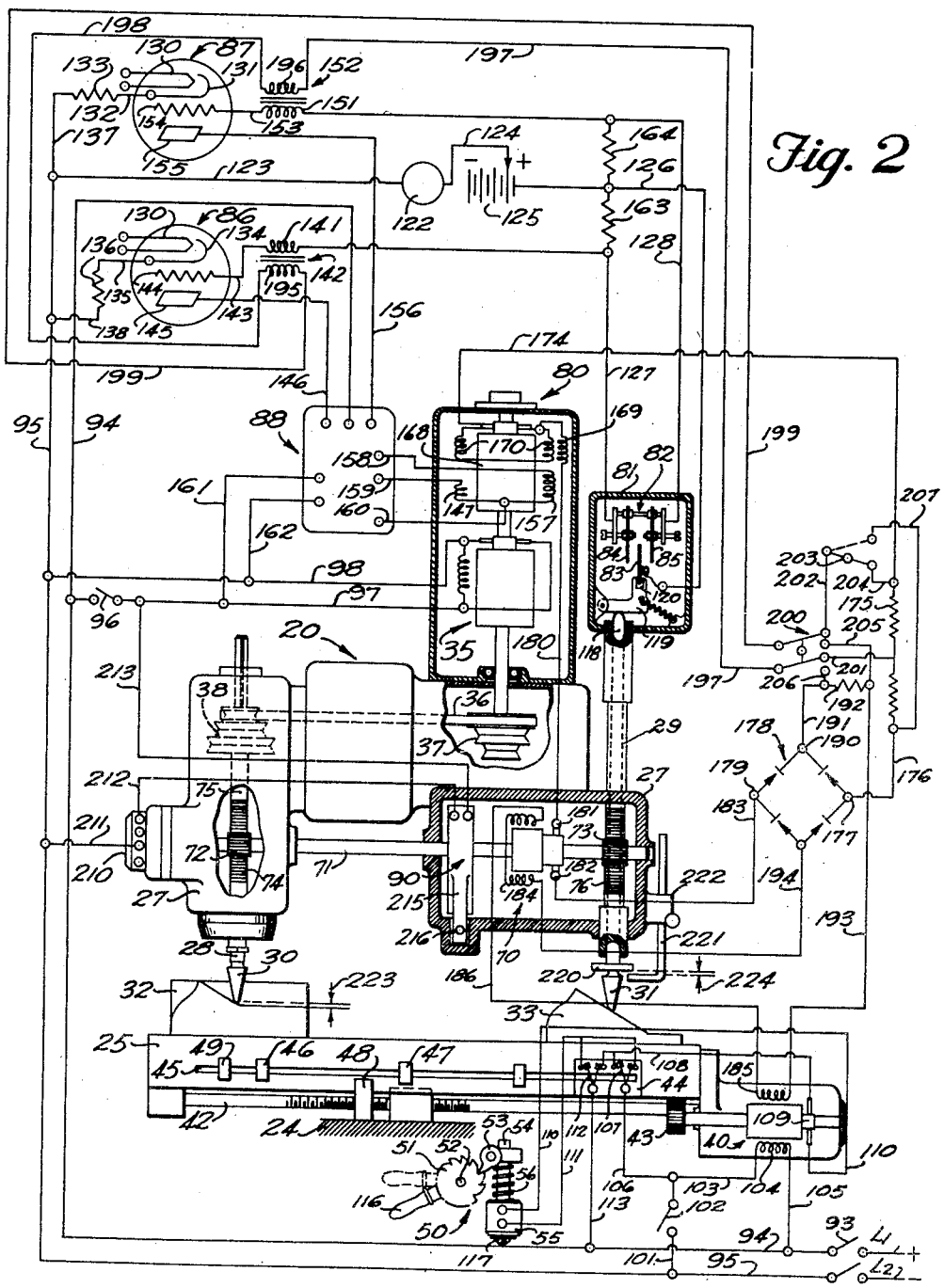
Fig. 2 is a schematic circuit diagram showing the electrical actuating and controlling system of the tracer controlled apparatus shown in Fig. 1.

The mechanism for effecting the automatic vertical feeding movement of the cutter spindle 28 and the tracer sleeve 29 includes a highly responsive feed-motor 70 that is mounted in the lower part of the attachment frame 27 as shown diagrammatically in Fig. 2 and is controlled electrically by movement of the tracer point 31. As indicated, the motor 70 is provided with a relatively long shaft 71 carrying pinions 72 and 73 fixed on each of its ends, respectively. The pinion 72 is disposed to mesh with a rack 74 formed on a vertically slidable quill 75 within which the cutter spindle 28 is rotatably mounted. The other pinion 73 meshes with rack teeth 76 formed on the vertically slidable tracer sleeve 29, the arrangement being such that the cutter spindle and the tracer sleeve are moved simultaneously in the same direction by any rotary movement of the motor shaft 71.

The motor 70 is operated in the one or the other direction by reversing the polarity of its current supply, the polarity and strength of its energizing current being controlled in response to deflections of the tracer point 31 in accordance with the contour of the pattern. Several forms of the control mechanism for providing reversible polarity energizing current to the actuating mechanism are illustrated in the accompanying drawings and described in detail hereinafter.

In the particular apparatus shown diagrammatically in Fig. 2, the energizing current for the motor 70 is provided from a generator 80 that operates under the control of the tracer mechanism. The generator 80 may conveniently be associated with and driven by the spindle driving motor 35, it being in this instance mounted directly above the motor on the same shaft to constitute a motor-generator set. Since the motor 35 operates at substantially constant speed, the generator 80 is driven uniformly and the polarity and strength of its output current may be regulated by controlling the generator field in response to the operation of the tracer mechanism.

In the particular apparatus here illustrated, a tracer box 81 carries a tracer mechanism 82 of the variable capacitance type that is provided with a movable condenser plate 83 arranged to be actuated by the tracer point 31 in operating over the pattern. Two stationary plates 84 and 85 are disposed at the opposite sides of the movable plate 83 and are electrically connected respectively with electronic tubes 86 and 87 mounted in the control cabinet 60. Movement of the condenser plate 83 toward one or the other of the stationary plates 84 or 85 results in the energization of the corresponding tube 86 or 87, thereby causing it to operate upon an amplifier unit 88. The amplifier 88 is in turn connected with the generator 80 and operates to establish a field current in the generator in direction to generate an output current of required polarity to cause the spindle feeding motor 70 to exert torque effecting movement of the cutter spindle in the direction and to the extent required in following the contour of the pattern 33.

An electromagnetic brake mechanism 90 is disposed to act upon the spindle moving shaft 71 and is interconnected with the tracer mechanism in such manner that the brake is applied at the proper times for checking excessive movement of the spindle quill in either direction.

Electrical energy for operating the several electric motors, the electromagnetic brake and other electrically operated elements of the tracer control system, is derived from a current source indicated in Fig. 2 by the line conductors L1 and L2. As shown, the conductors L1 and L2 are connected to a main switch 93 from which feed lines 94 and 95 distribute the current to the various pieces of apparatus.

The cutter spindle rotating motor 35, for example, may be supplied with energy by a circuit leading from the feed line 94 through a controlling switch 96 and a conductor 97 that leads to the one terminal of the motor 35, the other terminal being connected by a return conductor 98 to the other feed line 95.

The current supply for the table driving motor 40 and the associated cross feeding mechanism 50 is obtained through a circuit which leads from the feed line 95 by way of a conductor 101 to a control switch 102. From the control switch 102 a conductor 103 leads to a shunt field winding 104 of the motor 40 which is connected by a return conductor 105 to the feed line 94.

The control switch 102 is also connected by a conductor 106 to a switch contactor blade 107 of the double-pole, double-throw reversing switch 44. With the switch blade 107 in the position shown in full lines in the drawing, the circuit continues through a conductor 108 to an armature 109 of the motor 40 and thence through a conductor 110 to the one terminal of the solenoid 55 that actuates the cross feeding jogger mechanism. From the other terminal of the solenoid 55, a conductor 111 leads back to the reversing switch 44 wherein it has contact with a second switch blade 112; when in the position shown in solid lines, the switch blade 112 is connected by a return conductor 113 to the feed line 94. With the reversing switch blades in the positions shown, current from the feed lines flows through the motor armature 109 in manner to cause the motor 40 to operate in a direction of rotation for effecting a line feeding movement of the table 25 in a predetermined direction.

When the table arrives at the end of its line feeding movement, the reversing switch 44 is moved to the dotted line position by operation of the reversing dogs, as previously explained. With the reversing switch blade 107 in the dotted line position, current from the feed line 95 flows through the switch blade to the conductor 111 and thence through the solenoid 55 and the conductor 110 to the motor armature 109 from which the conductor 108 then connects with the other switch blade 112 leading to the return conductor 113. This results in current flowing through the armature 109 in reverse direction, and since the current through the shunt field 104 continues in the same direction, the direction of rotation of the motor 40 is reversed to effect the desired line feeding movement of the table 25 in the opposite direction.

At each reversal of the motor 40, the reversing switch 44 opens the circuit momentarily thereby de-energizing the cross feed solenoid 55. This permits the spring 56 to raise the armature plunger 54 thereby causing the pawl 53 to move upward and engage another notch of the ratchet wheel 51. When the switch 44 is then closed in the other position, the solenoid 55 is again energized and operates to move the armature plunger 54 downward thereby rotating the ratchet wheel 51 to effect a cross feeding movement. In order that the cross feeding movement may be effected in either direction, the ratchet wheel 51 is preferably connected to the cross feeding saddle screw 52 by means of suitable reversing mechanism controlled by a reversing lever 116. The reversing mechanism is so arranged that when the reversing lever 116 is in the position shown in solid lines, the saddle 24 will be fed transversely in one direction, while with the lever 116 in the position shown in dotted lines, the saddle cross feeding movement will occur in the other direction. The amount of the cross feeding movement may be regulated by adjusting a screw 117 at the bottom of the solenoid to change the stroke of the plunger.

As previously mentioned, the tracer mechanism which cooperates with the pattern 33 is of the variable capacitance type in which the movable condenser plate 83 operates between the two stationary plates 84 and 85 under the influence of the tracer point 31. As shown in Fig. 2, the tracer point or stylus 31 is mounted on the lower end of a spring retained actuating rod 118 within the tracer sleeve which is disposed to respond axially to the movement of the tracer stylus 31. The movable plate 83 is retained in a pivoted holder 119 rested upon the rod 118 and is insulated therefrom by an insulator 120. The two stationary plates 84 and 85 are adjustably mounted in the tracer box 81 in parallel relationship with the movable plate 83 which is interposed between them in a manner such that a deflection of the tracer stylus will cause the plate 83 to deviate from a neutral position, toward the left plate 84, while a release of the tracer stylus deflection will result in a movement of the movable plate 83 toward the right plate 85. Such variation of the spacing between the movable plate 83 and the two stationary plates 84 and 85 results in an increase in the capacitance between the two plates which come closer together, according to the formula $$C = \frac{kA}{t}$$

where C is capacity, k is constant equal to 1 for air, A is plate area and t is dielectric thickness or plate spacing.

Energizing current for the tracer mechanism circuit is provided by an oscillation generator 122 to which a conductor 123 extends from the feed line 95. A line 124 extends from the oscillation generator to the negative terminal of a bias battery 125 from the positive terminal of which a conductor 126 leads to the movable plate 83. As previously mentioned, the stationary plates 84 and 85 are connected to the two electronic tubes 86 and 87, the connections being effected by conductors 127 and 128 respectively through which the tracer circuit is completed.

The two electronic tubes 86 and 87 in the control circuit serve to detect and amplify electrical conditions and changes thereof set up in the tracer circuit by operation of the tracer mechanism. The tubes shown are of the triode type, each having a grid, plate or anode, filament, and cathode. A filament 130 in each of the tubes may be energized by an independent electrical supply source (not shown) in the usual manner.

A cathode 131 in the tube 87 is connected by a conductor 132 with a resistance 133. Likewise a cathode 134 in the tube 86 is connected by a conductor 135 with a resistance 136. These resistances are both connected to the feed line 95 by conductors 137 and 138, respectively. The triode tube 87 serves to detect the need for and relays an amplified electric tracer current for regulating the generator output corrective current in manner to exert upward movement feed motor torque, according to the charged condition of capacitance established by the movement of tracer plate 83 relative to plate 85. The tube 86 acts in the same manner from the charged condition of capacitance established by tracer plates 83 and 84, to control downward movement feed motor torque.

The conductor 127 is connected from the "down" plate 84 to a secondary winding 141 in a feed back transformer 142 from which a conductor 143 is connected to a grid 144 in the tube 86. An anode 145 in this tube is connected by conductor 146 to the power amplifier 88 which serves to magnify the "down" control current to the extent that when transmitted to a control field 147 in the generator 80, it effectively controls the polarity and output of the generator.

Likewise the line 128 connects the "up" plate 85 in the tracer mechanism with a secondary winding 151 of a feedback transformer 152 from which a conductor 153 is connected to a grid 154 in the triode tube 87. An anode 155 in the tube 87 is connected by a line 156 to the power amplifier 88 where the "upward" electric control current is magnified to the extent of effectively controlling the polarity and output of the generator corrective current as the control current is transmitted to a second control field 157 thereof.

As shown in the circuit diagram, a conductor 158 extends from a terminal of the power amplifier 88 to the control field 157 while another terminal of the amplifier is connected to the control field 147 in the generator by a conductor 159. The other side of both of the control field windings 147 and 157 are united by a common return wire 160 to a return terminal of the power amplifier 88. Power for the amplifier 88 is obtained from the feed lines 94 and 95 through the conductors 97 and 98 to which are connected two conductors 161 and 162, respectively, leading to the amplifier. When the motor switch 96 is closed to start the motor 35, the electrical power circuit to the amplifier 88 is also completed and the control circuit is thereby rendered operable.

The filaments 130 in the two tubes, when electrically energized, serve to heat the cathodes 131 and 134. The cathodes then emit electrons which carry currents from the anodes to the cathodes respectively, the anodes being positive with respect to the cathodes and the currents being subject to control action of the grids. The correct grid bias voltage is determined for efficient operation of the circuit and is selected at the bias battery 125. Resistances 133 and 136 connecting the cathodes with the feed line 95 independently cancel part of the grid bias voltage and stabilize the respective performances of tubes 86 and 87 by degenerative action. The respective currents in the anode circuits change as the voltages impressed on the grids are varied. Variation of anode current corresponds inversely with grid voltage negative potential (with respect to cathode) and variation thereof is effected by changes in the respective capacitances and in condenser charges stored between the movable tracer plate 83 and the respective adjustable plates 84 and 85, as well as by feedback voltages induced in the secondary windings 141 and 151. The grid 144 in the tube 86 is connected, through winding 141, with the plate 84 in the tracer mechanism and the voltage variations thereof effects the anode current variation to control "downward" movement torques of the tracer mechanism. In a like manner, changes in voltage across the movable plate 83 and the plate 85 in the tracer mechanism will effect a grid voltage variation in the tube 87 and a corresponding plate current variation to control "upward" movement torques of the mechanism.

This grid voltage variation, as caused by tracer action, is accomplished through grid rectification phenomenon as exemplified in what is termed grid leak power detection in the electronic art. The control here afforded is accomplished by variation in capacitance between plates 83 and 84 and plates 83 and 85 under movement of the stylus 31 and the charges thereof. These capacitances are shunted respectively by grid leaks 163 and 164. During each respective positive half cycle of voltage from the oscillation generator 122, an impulse of grid current flows to charge the tracer capacitances negatively. Part of these accumulated charges, representing a portion of the respective negative grid biases, escapes through the grid leaks during each succeeding negative half cycle of oscillator 122. The losses however are immediately replenished on the following positive swing.

The desired action is predicated on fixed values of capacitance between the plates 83 and 84 and the plates 83 and 85. As these capacitances vary according to tracer stylus deflections however, the voltages across the plates change according to the formula $$e = \frac{Q}{C}$$

where $e$ is voltage, $Q$ is charge and $C$ is capacitance. The rate of charge dissipation through the grid leaks 163 and 164 also changes according to Ohm's law for current flow, and the respective grid potentials of tubes 86 and 87 are thereby adjusted for a change in tracer stylus deflection. The time constant of the circuit composed of grid leak and grid condenser (tracer capacitance) is so predetermined that as the capacitance for one set of condenser plates is decreased by stylus deflection the rate of loss of charge through the grid leak will allow the controlled grid potential to become less negative at a rate most favorable for the control desired.

When the movable tracer plate 83 is in a central position between the two stationary plates 84 and 85, the two capacitance values are equal and the grid voltages of both of the electronic tubes 86 and 87 are likewise equal. The tubes balance out to cancel generator output, and the feed motor 70 exerts no driving torque. For this balanced condition, the anode control current flow consists of positive half cycle peaks at the frequency of the oscillator 122 and is equal in the two control field circuits. The anode currents are preferably of low average value when balanced and depend on grid circuit design and adjustment.

The generator 80, which is driven by the motor 35 as previously mentioned, includes an armature 168, a series field 169, and a shunt field 170, in addition to the two control fields 147 and 157 already mentioned. The shunt field 170 is connected across the armature terminals while the series field 169 is connected in series with the armature. The electric control currents flowing in either or both of the control fields serve to control the corrective current output of the generator. A change in the predominance of the magnetomotive force of one field over that of the other field effects a corresponding change in the magnitude and polarity of the generator corrective current output. This reversible output is adapted to regulate the driving power sources of the machine, namely the spindle feed drive motor 70 which is arranged to raise and lower the tracer sleeve and cutter spindle, and the table feed drive motor 40 which is arranged to effect the longitudinal movement of the table in either direction, the table movement in turn functioning to regulate the cross feed indexing mechanism 50 attached to the saddle screw to effect movement of the saddle and consequently the sidewise movement of the table, as previously explained.

As shown in the circuit diagram, one lead wire 174 from the generator is connected to one end of a center tap resistor 175 and the circuit leads thence from the outer end of the resistor through a conductor 176 to one input terminal 177 of a bridge rectifier 178. A second input terminal 179 of the rectifier 178 is supplied with current from the generator 80 through a conductor 180 leading from the series field 169 to a feed motor armature brush 181, the circuit leading thence from a brush 182 through a conductor 183 to the input terminal 179. The rectifier 178 in the generator output circuit maintains the flow of current unidirectional through field windings 184 and 185 respectively of the spindle feed motor 70 and the table feed motor 40 which are connected in series through a conductor 186. Reversal in the direction of rotation of the motor 70 will occur upon each reversal of polarity in the output flow of the generator 80. Thus, if the generator output line 174 is rendered positive by a corrective current flowing from the generator 80, the corrective current can flow only from the terminal 177 of the rectifier through a branch thereof connecting with a terminal 190. The flow will then occur through a conductor 191 to a resistor 192, thence through a line 193 to the control field 185 in the table feed drive motor 40, the line 186 to the field 184 in the spindle feed motor 70 and then by way of a line 194 to the return terminal of the rectifier. From the return terminal, the corrective current will flow through the lower branch of the rectifier 178 to the terminal 179 and thence through line 183, the spindle feed motor armature brush terminals 182 and 181 and finally through line 180 to complete the circuit to the generator.

On the succeeding reverse in polarity, the other generator output line 180 will be rendered positive by a reversal of polarity in the generator output current. The corrective current will then flow through this line to the spindle feed motor armature brush terminals 181 and 182, the line 183, the terminal 179 of the bridge rectifier and the upper branch of the rectifier to the terminal 190. From this terminal, the current flows through the conductor 191, the resistor 192, the line 193 to the control field 185 of the table feed motor, and thence through the line 186 to the field 184 of the spindle feed motor 70. From the field 184, the current returns through the line 194 to the bridge rectifier and finally through the line 176, the resistor 175 and the line 174 to complete the circuit to the generator.

From the foregoing explanation of the two circuit paths, it is clear that the bridge rectifier 178 maintains the flow of corrective current unidirectional through the spindle feeding motor field 184 and the table feeding motor control field 185 regardless of reversal in polarity of the generator output. Consequently, reversal of the corrective current flow from the generator to the armature brush terminals 181 and 182 and hence through the armature of the spindle feed motor 70 will result in effecting a reversal in the direction of torque effort of the motor. Reversal of the corrective current effects reversal in polarity of the voltage drop across the resistor 175 but the rectifier unit 178 effectively prevents reversal in the direction of flow of the current through the spindle feeding motor field 184 and the table motor control field 185.

As previously explained, the controlled current flow through the armature and field of the spindle feeding motor 70 is varied by action of the generator 80 under the control of the tracer mechanism in accordance with the amount of feeding movement required in following the contour of the pattern. Accordingly, the rate of spindle feeding movement may vary continually as the tracer traverses the pattern. In order that the resultant feeding movement between the cutter 30 and the work piece 32 may be maintained substantially constant, the table feeding motor 40 is controlled inversely to the spindle feeding motor. To this end, the same current which flows through the spindle feeding motor and the unidirectional circuit controlled by the rectifier 178 is led through the table motor control field 185 as previously mentioned. To provide the desired inverse action, the table feeding motor control field 185 is arranged to buck the action of the motor shunt field 184. Consequently, as the amount of current through the spindle feeding motor increases to increase or to maintain the feeding rate of the spindle, the current flowing through the bucking control field 185 likewise increases and effects a reduction in the speed of the table feeding motor 40.

Conversely, when pressure on the tip of the tracer stylus is relieved to require less torque effort of the spindle feed motor, the reduced generator output corrective current flowing through the control field 185 of the table feed motor will be less effective in bucking the current in the field 184 and the result will be an increase of table motor torque to effect an increase in speed of table travel. This control feature is especially valuable in that the maximum and most efficient tracing rate can be maintained at all times throughout a given tracing operation. The finish on the work piece is uniform throughout since the combined feed rate of the cutter spindle and the work piece tends to be uniform at all times. When a steep portion is reached in the contour of the pattern, the tracer and cutter spindle feed rate is increased while the table feed rate is reduced. Likewise, when a fairly level area in the contour of the pattern is reached, the vertical movement of the tracer and cutter is reduced considerably, and the table feed rate is proportionately increased to maintain a predetermined cutting rate in the direction of the pattern surface.

A supplemental feedback control to the grids of tubes 86, 87, Fig. 2, is provided by the transformers 142, 152. The primaries 195, 196 are in series and the series circuit is connectable, by switch means including a double-pole double-throw switch 200 and a polarity switch 203, to selectively include in the series circuit either the upper half of the resistor 175, or the lower half thereof, or a resistor 192, whereby to respectively effect different control results supplementing the normal control result of tracer 82. Thus the series-circuit conductors 197 and 199 are connected to the terminals of the double-pole, double-throw switch 200 and the action of such switch may be modified by polarity switch 203. When both switches are positioned as shown in Fig. 2 the conductor 197 is connected to the center tap of the resistor 175 by a conductor 201, while the conductor 199 connects with the upper end terminal of resistor 175 through a conductor 202, the polarity switch 203 and a conductor 204. This switch connection, provides a first method of control in which the voltage drop across the upper half of resistor 175 is caused to be impressed on the primaries 195 and 196 of the transformers 142 and 152, and when the voltage drop across resistor 175 varies in magnitude or direction the flux in the transformers 142 and 152 changes to induce voltages in the secondaries 141 and 151 thereof respectively to modify the respective control action of the tubes 86 and 87.

The transformer windings are so connected that for the positions of switches 200, 203 just mentioned a decreasing "down" direction current through resistor 175 induces in the secondary 151 a voltage causing grid 154 of tube 87 to become more negative, and simultaneously induces in the secondary 141 a voltage causing grid 144 of tube 86 to become more positive. This same change in grid potentials likewise occurs for increasing up direction current in resistor 175.

In either case the feedback result operates to oppose and delay the normal tracer-controlled change of torque of motor 70.

Also for the same positions of switches 200, 203 a decreasing up direction current in resistor 175 will cause grid 154 of tube 87 to become more positive and grid 144 of the tube 86 to become more negative, and the same change in grid potentials occurs during, increasing down direction current in resistor 175. Here again the feedback effect is to oppose and delay the normal tracer-controlled change of torque in motor 70.

Accordingly with the switches 200, 203 in the position shown in Fig. 2 the resulting feedback to the tubes 86 and 87 provides de-generative action for tube 87 and regenerative action for tube 86 when the torque of feed motor 70 is either diminishing "down" direction torque or increasing "up" direction torque as qualified by rate of change of the generator current against time. Conversely the feedback provides regenerative action for tube 87 and degenerative action for tube 86 when the torque of feed motor 70 is either diminishing "up" direction torque or increasing "down" direction torque as qualified by rate of change of the generator current against time.

Thus the described first method of control may be said to provide an anticipatory influence for both directions of torque effort and to effect a modulating or proportioning action of damping. The word "anticipation" as here applied refers to the diminution of torque effort of the spindle feed motor 70 through feedback, and for this case is proportional to the time rate of change of the tracer initiated corrective current, for a given tracer stylus deflection. In this sense the feed motor torque is automatically checked to "anticipate" satisfaction of the tracer stylus deflection and thereby establish the right amount of correction.

Since tracer controlled grid voltages are a function, of the position of movable plate 83 between the plates 84 and 85 of the tracer, the "anticipator" control aforedescribed might also be conceived of as having its origin in the tracer box 81. If the condenser plates 84 and 85 are imagined as being fixed to a common shiftable yoke (not shown) capable of motion in line with the motion of plate 83 and this yoke is caused to follow up a movement of plate 83 so as to partially restore the original relative position of plate 83, but only during a change of their relative positions, in accordance with the time rate of change of generator current, then this same described "anticipator" feedback action may be achieved.

For certain types of tracer cuts, with special reference to finishing cuts, this mode of operation is especially to be preferred, since overtravel of the cutter must be held to an absolute minimum as the final skin cut is made over the work to obtain a finished surface.

Another or second mode of operation is provided to secure control of a different nature which is to be preferred for roughing cuts because of the particular ability to exert cutting pressure as well as quickly relieve the cutter of the work and at the same time accomplish stable operation. This other mode of operation is effected by throwing the switch 200 to its lower position whereby conductor 199 is joined to a conductor 205 thereby making connection with one terminal of the resistor 192, and whereby conductor 197 is joined to a conductor 206 thereby making connection with the other terminal of resistor 192. In this case, similar to the previous case, when the current through resistor 192 changes, there will be induced in the secondaries 141 and 151 feedback voltages proportional to the rate of change of current, but in this case the current through the resistor 192 is unidirectional by reason of the rectifier 178.

Thus, by the proper connections of the transformers 142 and 152, there is provided for either output polarity of the generator 80, a feedback current created by the voltage drop across resistor 192 which renders grid 154 of tube 87 more positive and grid 144 of tube 86 more negative during increasing generator output corrective current, and in opposite fashion the feedback renders the grid 154 of tube 87 more negative and the grid 144 of tube 86 more positive during decreasing generator output corrective current. Thus no matter whether the corrective effort of spindle feed motor 70 be for "up" torque or "down" torque, an increase in torque effort is accompanied by regenerative feedback to tube 87 and degenerative feedback to tube 86 and a decrease in torque effort is accompanied by degenerative feedback to tube 87 and regenerative feedback to tube 86.

Here too, we may consider the case where plates 84 and 85 are imagined as being fixed on a common shiftable yoke and moved in accordance with the time rate of change of generator corrective current. If the yoke is moved to increase the spacing between plate 85 and plate 83 for any change in position of plate 83, whether it be toward or away from plate 85, the yoke being restored to its original position when the plate 83 assumes a fixed position, then the feedback control for this second mode of operation is accomplished in mechanical fashion to duplicate the electrical method described.

This second method of feedback control therefore effects a maximum initial corrective current value with a succeeding diminution to normal value for "up" direction torque effort as the tracer stylus is deflected upwardly and then maintained constant, and effects a slowly rising delayed corrective value with a succeeding rapid rise to normal value for "down" direction torque effort as the tracer stylus is deflected downwardly and then maintained constant.

Control of this nature provides more than normal initial torque for rapid "up" travel away from the work when the stylus is deflected to cause plate 83 to move away from plate 85, with a succeeding diminution of corrective current and torque of the spindle motor 70, following the maximum initial value. It also affords less than normal initial torque whereby to cause a checked initial downward movement of the spindle toward workpiece, as the tracer stylus deflection is lessened to cause tracer plate 83 to move away from plate 84, with a succeeding increase in corrective down current and torque of the spindle feed motor 70, thus providing torque effort to back up the cutter with pressure for roughing cuts. This performance precludes overtravel in a downward direction by the surge of initial "up" torque and prevents undercutting the work inside the definite envelope of the motion or outline of the travel as established by the configuration of the pattern.

Another or third mode of feedback operation is provided, in which the series circuit of the transformer primaries 195, 196, Fig. 2, includes the lower position of the resistor 175. Thus with the switch 200 in the upper position as described for the first mode of operation, the polarity switch 203 is thrown to its upper position instead of the lower position shown, whereby to connect with a line 207 instead of the line 204. The effect of changing the position of polarity switch 203 is to reverse the polarity of the conductors 197 and 199 and of the feedback grid bias on tubes 86, 87, as compared to the first described feedback method.

This third mode of operation, as might be expected, is opposite in effect to the first mode of operation because of the effect of reversed feedback voltages on the instantaneous grid voltages. Briefly, the resulting feedback to the tubes 86 and 87 provides regenerative action for tube 87 and degenerative action for tube 86 when the torque of feed motor 70 is either diminishing "down" direction torque or increasing "up" direction torque and provides degenerative action for tube 87 and regenerative action for tube 86 when the torque of feed motor 70 is either diminishing "up" direction torque or increasing "down" direction torque. Similarly to the previously described methods, in each instance the intensity of the instant feedback result varies directly as the rate of change of current in the resistor 175.

For this third method of control the feedback operates to initially increase the normal value of any tracer-controlled change of current from generator 80 to motor 70, whereby to initially increase any corrective torque exerted by the motor.

Since the feedback occurring in push-pull fashion is in an aiding sense for each movement of the tracer stylus, the imagined "common shiftable yoke," earlier referred to in explaining the previous two modes of operation, may here be conceived of as moving in accordance with the time rate of change of corrective current together with the condenser plates 84 and 85, in "over center" style, to set up a swing from one extreme position to the other, and simulate the feedback action just described. The oscillations in tracer current thus set up by the third method of feedback would normally tend to produce a mechanical oscillating or hunting condition in the vertical movements of the tracer sleeve and cutter spindle, except for the stabilizing influence of the previously mentioned mechanical brake 90 and its control apparatus. Since the speed of vertical response and follow is greater under this arrangement, more rapid rates of line feed are permitted. This mode of operation may be preferred especially where a softer material such as brass is being machined.

In order to prevent hunting and overtravel of movement of the cutter and the tracer under conditions in which the feedback circuit does not provide the anticipatory influence occurring under the first mode of operation, the electromagnetic brake 90 is arranged to be engaged automatically during deceleration of the feed motor and to be released whenever the feed motor exerts torque for effecting an accelerating action. As shown in the circuit diagram, the brake 90 is under the control of a direction conscious acceleration-deceleration brake switch 210 mounted on one end of the tracer frame 27 and operatively connected to the shaft 71. The electromagnetic brake 90 is of the magnetically released type in that it is arranged to be disengaged when the magnet is energized and to engage automatically upon de-energization of the magnet. Current for energizing the brake magnet is derived from the feed line 95 from which a conductor 211 leads to the brake switch 210 that is in turn connected to the winding of the brake 90 by a conductor 212. A return conductor 213 leads from the brake winding to the conductor 97 of the spindle driving motor circuit through which a return connection is effected by means of the switch 96 to the feed line 94, the arrangement being such that the brake circuit is de-energized whenever the switch 96 is opened to stop the spindle driving motor 35.

The brake controlling switch 210 is so arranged that it moves to closed position upon acceleration of the shaft 71, the brake 90 thereby being energized for movement to its disengaged position. Upon a decelerating action of the shaft 71, the switch 210 opens, thereby de-energizing the winding of the electromagnetic brake 90 and permitting the brake to engage to assist the decelerating action and prevent overruning of the motor which might otherwise result in inaccurate positioning of the cutter 30.

The brake switch 210 is equipped with means responsive to changes in direction of rotation of the shaft 71 and operative to condition the switch for responding to acceleration or deceleration of the shaft in accordance with its direction of rotation as is more fully explained hereinafter in connection with Figs. 7 and 8. To permit slight movement of the shaft 71 in reverse direction for actuating the direction conscious element of the switch 210, the brake 90 is mounted in manner to provide a small amount of lost motion. To this end, the brake 90 is fitted with a reaction torque arm 215, the extending end of which is positioned between a pair of adjustable abutment screws 216. The abutment screws are spaced to permit limited reverse movement of the shaft 71 without interference from the brake, of an amount sufficient to condition the direction responsive element of the switch 210 to effect release of the brake in response to acceleration in the reverse direction. After the lost motion has been taken up, the torque arm 215 again engages an abutment screw 216 in manner to resist further turning movement when the brake is engaged during the next decelerating action.

It is to be understood that the brake reaction arm lost motion arrangement shown in Fig. 2 represents only one method of accomplishing actuation of the direction responsive element of the acceleration brake switch upon reversal of the feed motor and prior to brake release, and that it serves to illustrate the principle only.

Another method of accomplishing actuation of the direction responsive acceleration brake switch 210 prior to brake release, comprises mounting the brake switch for actuation directly on the feed motor armature shaft and then transmitting the corrective feed motor torques through a lost motion elastic coupling (not shown) to the shaft 71. In this case, the reaction arm 215 of the brake 90 is tightly clamped between the abutment screws 216 to eliminate lost motion.

In utilizing a relatively small cutter to machine a work piece from a pattern of the shape shown in Fig. 2, for example, it is not feasible to attempt to remove metal to the full depth of the cut in one stroke. Accordingly, it is desirable to remove the excess metal stock by a series of layer cutting operations of predetermined limited depth, the depth of cut depending upon the type and size of the cutter, the hardness of the material and other factors.

For thus limiting the maximum depth of the cut, the tracer stylus 31 is provided at its upper end with an extending flange 220 that is adapted to cooperate with an adjustable tripper 221. As shown in the drawing, the tripper 221 is adjustably retained in a clamp 222 attached to the frame 27 adjacent to the tracer sleeve 29. The tripper is provided with an arm disposed to contact the lower surface of the flange 220 in such manner that when the cutter and tracer are fed downward to the predetermined depth the flange will engage the tripper and arrest movement of the tracer point, thereby causing the tracer mechanism to operate in a manner to stop the downward feeding movement.

If the table 25 is assumed to be moving to the left in Fig. 2, the tracer point 31 and the cutter 30 will move downward in following the sloping surface of the pattern 33. As there shown, the cutter 30 has almost reached the maximum depth of the cut indicated by the horizontal line on the work piece, the vertical distance yet to be traveled being indicated by the distance set off by the arrows 223. This distance of further downward movement is the same as the distance indicated between the arrows 224 representing the space betwen the flange 220 on the tracer point and the tripper 221. When this further distance of downward movement has been traversed, the flange 220 will engage the tripper 221 thereby stopping downward feed movement and the table will continue in its longitudinal feed movement to cause the cutter to machine a horizontal surface on the work piece.

After the entire surface of the work piece 32 has been machined to the predetermined limited depth, the clamp 222 may be loosened and the tripper 221 moved downward a distance equivalent to the depth permissible for the next succeeding cut, whereupon the tracing operation may be repeated to remove another layer of stock from the work piece.

Figure 3:
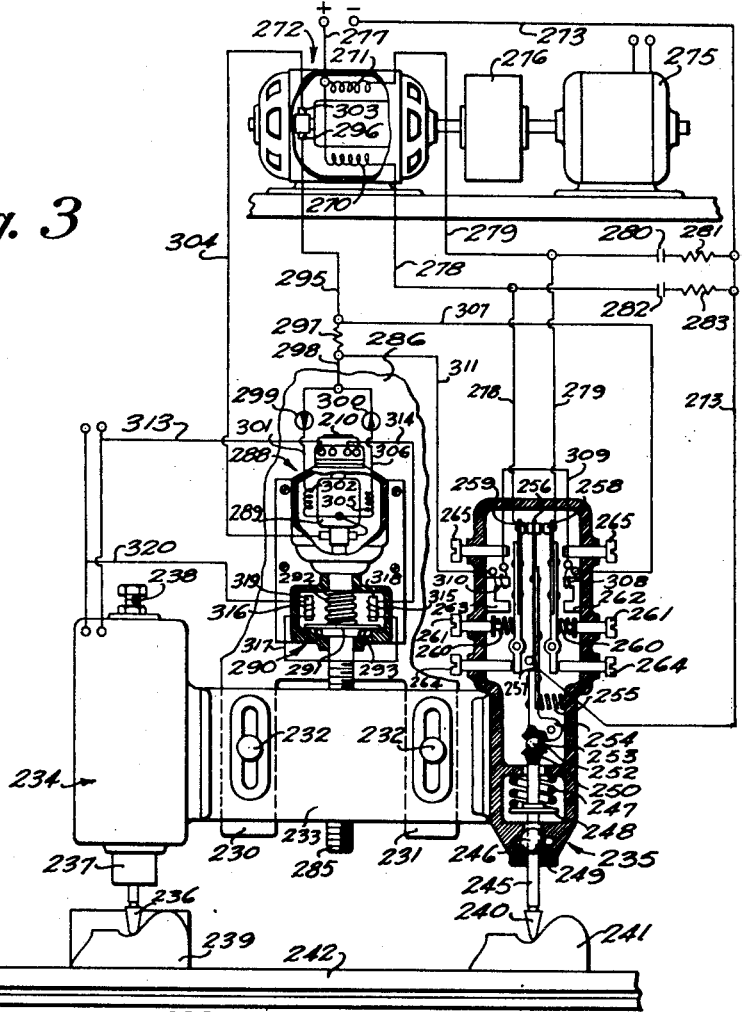
Fig. 3 is another schematic circuit diagram showing a modified form of the control circuit and a different arrangement of the parts.

A second electrical circuit exemplifying the principle of reversible polarity tracer control is shown in Fig. 3. In this case a variation in the mechanical tracer structure is shown associated with a work table that may be provided with table and saddle drive structures which are identical with those of the machine shown in Figs. 1 and 2. The attachment shown includes a working head or frame 233 that is slidably supported for vertical operation on two ways 230 and 231 of a suitable supporting base plate and slidably retained in position by two studs 232 extending through two vertically disposed slots in the supporting frame 233 of the attachment. A rotatable cutter spindle assembly 234 is disposed on the left end of the frame 233 while a tracer assembly 235 is disposed on the right end of the frame. The cutter 236 is locked in a taper-bored spindle 237 by means of a drawbar 238. The spindle 237 is appropriately geared to a variable speed electric motor (not shown) enclosed within the spindle assembly 234. Variations in the speed of the cutter operating on the work piece 239 are effected by controlling the electrical input to the spindle motor.

The tracer assembly 235 includes means for retaining a tracer stylus 240 in operable relationship with a pattern 241 clamped on a work table 242 together with an electrical mechanism designed to convert the tracer stylus movements into corrective electric currents. A tracer rod 245, slidably extends through a ball 246 with a shoulder on the rod biased against the upper s'ie of the ball 246 by a spring 247 reacting between an abutment on the frame 235 and a washer 248 rigidly affixed on the rod 245. The ball 246 is suspended in a ball socket 249 integrally formed in the frame 235 as is shown in Fig. 3. The slidable relationship between rod 245 and ball 246 permits axial movement of the stylus 240 and rod 245 against the bias exerted by spring 247 so that the shoulder on rod 245 always returns to a normally seated position against the top surface of ball 246 when permitted according to the manner in which stylus 240 engages the pattern 241.

A half-ball socket 250, integrally formed on the upper end of the tracer rod, is adapted to receive a ball 252. A second half-ball socket 253 formed integrally with the extending portion of a pivotally mounted bell-crank 254 is adapted to fit on the top of the ball 252. A spring 255 reacting against the frame 233 and abutting the arm of the bell-crank 254, serves to retain the bell-crank in constant contact with the ball 252 which engages the tracer rod 245. A double-faced, insulated contact 256 is attached to an extension arm 257 fastened to the bell-crank and is constrained for movement between a pair of vibratory contacts or armatures 258 and 259. These two armatures are fulcrumed in the tracer frame 235 with the contact surfaces thereof in alignment with the surface of the movable contact 256. Springs 260, biased between the armatures and adjustable screws 261, are set in the tracer frame 235 to oppose the magnetic attraction of electromagnets 262 and 263 arranged to act upon the armatures respectively. Two pairs of limit abutment screws 264 and 265 mounted to engage the ends of the arms of the vibratory armatures 258 and 259 tend to restrict the swing of the armature contacts during the cyclic vibrations.

The electrical circuit consists of two portions, a control circuit and a generator output circuit. The corrective electrical current originates in the control circuit and is transmitted to control field 270 and 271 of a generator 272. A line 273 extends from a direct current supply source to the movable contact 256 in the tracer assembly. This contact is moved by the axial and sidewise movement of the tracer rod 245 as the tracer stylus 240 retained thereon responds to variations in the contour of a given pattren. A predetermined amount of deflection imparted to the tracing stylus will effect a balanced condition between the movable contact 256 and the two vibratory contacts 258 and 259. This position of the tracer rod 245 and bell-crank extension arm 257 is designated as the neutral position, since no electrical energy or a minimum amount thereof will then pass between the contact 256 and either of the vibratory contacts 258 and 259. However, as the pressure on the stylus is decreased to effect a movement away from the neutral position, the movable contact 256 will tilt to the left, engage the vibrating contact 259 and the resultant generator output corrective current flow will effect a downward movement of the tracer and cutter.

Likewise, as the tracer stylus is deflected to effect return to the neutral position and beyond to the other side of neutral, contact 256 will tilt to the right, engage the vibrating contact 258 and the resultant generator output corrective current flow will effect an upward movement of the tracing stylus and cutter. In either case the tendency is to react in such manner as will reestablish the neutral condition between the contacts. The tracer control currents thus initiated by action of the tracer stylus in following the contours of a given pattern are transmitted to the control fields 270 and 271 in the generator 272 to effectively regulate the polarity and magnitude of generator output corrective current.

The generator 272 is driven by a constant speed electric motor 275 coupled to it. A flywheel 276 is interposed between the generator and motor in order to stabilize the inertial forces and equalize the rotative speed of the generator. Variations in the speed of the generator, if permitted, would tend to distort the effect of the electric control currents flowing in the control fields of the generator and therefore cause a distorted output.

The generator control fields consist of two separate windings 270 and 271 adapted to control generator output polarity with the field winding 271 predominating for "down" feed motor torque and the field winding 270 predominating for "up" feed motor torque. One end of each of the field windings is connected to a line 277 which extends from the supply source. A line 278 from the control field 270 leads to the left or "down" vibrating contact 259 and serves to conduct the "down" electric control current to the generator while a line 279 from the other control field 271 to the right or "up" contact 258 serves to conduct the "up" electric control current to the generator. A condenser 280 in series with a resistance 281, interposed between the line 273 and the line 279 serves to minimize the sparking which ordinarily occurs each time the movable contact 256 engages the contact 258 within the tracer mechanism. For the same reason a condenser 282 in series with a resistance 283 is connected between the line 273 and the line 278.

Vertical positioning of the tracer attachment head or frame 233 is accomplished by means of a motorized screw shaft 285 rotatively supported on a base plate 286 of the attachment. The screw shaft projects vertically through a threaded nut element integrally formed through the center of the adjustable frame 233. The screw shaft 285 constitutes an extension of an armature shaft that is journalled in a series wound electric motor 288. An armature 289 within the motor 288 is mounted directly on the shaft 285. A reverse acting electric brake 290 located on the shaft directly below the motor 288 serves to brake the rotating screw shaft 285 whenever the rotative torque of the shaft decelerates or ceases rotation. A plate 291 is slidably keyed to the shaft for axial movement to form a single rotatable unit. This plate is urged by a spring 292 to effect engagement of the braking surface thereof with a stationary brake surface 293 parallelly disposed to the plate 291, at right angles to the axis of the screw shaft 285.

A line 295 is connected to one of the generator rotor brushes 296 and to a resistance 297. From the resistance 297, a line 298 extends to a pair of parallelly connected rectifiers 299 and 300. From the rectifiers the energy is directed to the motor. The two rectifiers serve to render the circuit to the feed motor 288, polarity conscious and thereby effect a reversal of the feed motor torque for each corrective current polarity change. Energy is conveyed from the rectifier 299 via a wire 301 to a series field winding 302 connected in series with the armature 289 of the feed motor 288. The circuit is completed from the armature 289 of the feed motor to the generator armature brush 303 by a wire 304. With the current flow in this direction, rotative torque is exerted by the feed motor armature on the screw shaft 285 to impart a downward motion to the tracer attachment and to subsequently bring the tracer stylus 240 and cutter 236 into contact with the pattern 241 and work piece 239, respectively. If an upward movement of the tracer attachment is demanded by the tracer mechanism, the generator output corrective current will originate at the armature brush 303 and flow through the wire 304, the armature 289 of the motor 288, a series field 305, a line 306, the rectifier 300, the line 298, the resistance 297, the line 295, and the brush 296 to complete the circuit. Separate series fields are provided in the feed motor 288 in order to obtain a torque reversal thereof for each polarity change in the generator output corrective current.

The two contacts 258 and 259 in the tracer mechanism 235 are caused to be vibrated for the purpose of affording a modulated resultant output of the generator 272 in the following manner: A line 307 extends from the generator output line 295 to a coil 308 surrounding the electromagnetic core 262 designed to magnetically vibrate the armature of the "up" contact 258. The coil 308 is series connected by a line 309 to a like coil 310 surrounding the electromagnetic core 263, positioned to magnetically vibrate the armature of the "down" contact 259. A line 311 from the coil 310 to the line 298 completes the circuit. The voltage drop across the resistance 297, as set up by corrective current flow through the resistance, serves to create a flow of current through the electromagnetic coils. The cyclic flow of generator output corrective current in either direction through the feed motor circuit causes both coils 308 and 310 to intermittently become energized and de-energized, and, consequently, magnetically attract and release the contact arms 258 and 259 to create a vibratory action. These vibrations are synchronized with the frequency of the generator output corrective current reversals.

Provision is made to brake the torque of the driving motor 288 and the vertically disposed screw shaft 285 driven thereby. As previously explained, the brake mechanism 290 is positioned directly below the motor while the brake switch 210 is disposed above the motor. Both are operably connected to the shaft 285, as previously explained, in connection with Fig. 2. A line 313 connects the current supply source with the brake switch 210. The switch 210 and the brake mechanism 290 are serially connected by a conductor 314. The conductor 314 is connected to an electromagnetic brake coil 315 which, in turn, is serially connected to another brake coil 316 by a conductor 317. Coil 315 is wound on an iron core 318 while coil 316 is wound on an iron core 319. The cores are diametrically disposed with respect to the shaft 285 within the brake mechanism 290 and fixedly retained to impart a magnetic attraction to the rotatable brake plate 291. The circuit from the coil 316 is completed to the supply source by a conductor 320. This supply source is also used to energize the spindle drive motor (not shown) built into the spindle assembly 234.

Whenever the switch circuit within the switch 210 is completed, brake current flows to energize the electromagnetic coils 315 and 316. Magnetic fields which emanate from the electromagnetic cores 318 and 319 respectively upon the occurrence of a current flow through the coils magnetically draw the plate 291 upwardly away from the stationary brake surface 293 against the bias of the spring 292 to release the braking torque normally existing through engagement between the brake plate 291 and brake surface 293.

When the switch circuit in the brake switch 210 is opened, brake current ceases to flow and the electromagnetic fields collapse to permit the comparatively stiff spring 292 to instantly urge engagement between brake plate 291 and brake surface 293 to re-establish normal braking torque and resist any rotation of brake plate 291 and the shaft member to which it is keyed.

Figure 4:
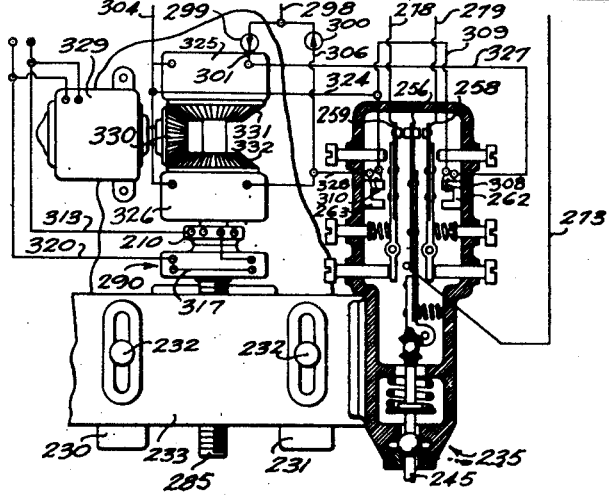
Fig. 4 is another schematic diagram showing part of the control circuit of Fig. 3 as applied to a machine having a magnetic clutch driving arrangement.

The application of magnetic drive clutches to a tracer system together with a variation in the tracer vibrator circuit is exemplified in Fig. 4. The frame structure and the tracer mechanism is identical to that shown in Fig. 3 and for purposes of identification bears like numerals. As in Fig. 3, the control circuit is fed by the line 273 extending to the movable contact 256 from the supply source, and the lines 278 and 279 extend from the vibratory contacts 259 and 258, respectively to the generator control fields 270 and 271. The principal difference between the circuits of Figs. 3 and 4 resides in the connections for energizing the electromagnetic coils 308 and 310 in the tracer assembly 235. In Fig. 3, the coils 308 and 310 are serially connected whereas in Fig. 4 the interconnecting wire 309 is tapped with a line 324 which is connected to the common corrective current feed line 304 that also serves to supply current to clutches 325 and 326. Two lines 327 and 328 connected to the free ends of the electromagnetic coils 308 and 310, respectively join them with the corrective current feed lines 306 and 301 to achieve vibrator action in each of the electromagnets 262 and 263 independent of the other. This arrangement affords a connection of the electromagnetic coils 308 and 310 with their respective clutch coils.

The screw shaft 285 rotatably mounted to effect upward and downward movement of the tracer cutter assembly is driven by the magnetically energized, direct-action clutches 325 and 326. A motor 329, connected to an appropriate supply source, is positioned at right angles to the shaft 285 and drives a gear 330. This gear meshes with two identical gears 331 and 332 rotatably mounted on the screw shaft 285. Each of these gears is keyed to drive an electromagnetically controlled member of the associated clutch unit. These members are adapted to be electrically energized and engage adjacent cooperating clutch plates keyed on the screw shaft in a well known manner. Since the two gears 331 and 332 rotate oppositely from each other they impart corresponding rotative motion to the clutch plates within the clutch units and to the screw shaft. The brake 290 is identical with the one previously described in connection with Fig. 3.

The generator output corrective current is reversible and dependent upon the dictates of the generator field control currents. At the instant when upward motion of the attachment frame is required, the corrective current will originate in the generator and flow along the line 298 through the rectifier 299, a line 301, to the "up" clutch 325 and thence return to the generator via the line 304 to complete the circuit. Thus the magnetic attraction created within the direct action clutch 325 by this corrective current tends to magnetically urge the clutch member and plate together and the member is then able to transmit rotative torque to the clutch plate and to the screw shaft 285. The tracer assembly threadably attached to the shaft will then be moved upwardly since this accelerating torque accomplishes rotation of the shaft.

Due to the initial lost motion interval in which the brake reaction arm of brake 290 functions as the shaft 285 starts rotation for "up" travel, the direction acceleration brake switch 210 will have closed its switch circuit to energize brake 290 for release of brake torque during this upward acceleration movement.

If the next corrective current calls for downward movement of the cutter spindle and tracer sleeve, the current will flow along the line 304 to the "down" direct-action clutch 326 and then through line 306 and the rectifier 300 back through line 298 to the generator. No corrective current flows in the direct-action clutch 325 at this instant because current flow in this direction through rectifier 299 to line 298 for return to the generator is not possible.

The magnetic attraction thus created within the direct action clutch 326 by corrective current tends to magnetically urge the clutch member and plate together to transmit rotative torque to the clutch plate and screw shaft 285. This torque is decelerating (plugging) in effect and acts to arrest the existing upward velocity. The first effect of deceleration is to actuate the inertia mass switch of the brake switch 210 and open the switch-brake circuit. Brake 290 immediately responds and assists the deceleration with braking torque until such time as the motion is arrested. The persisting torque of the direct action clutch 326 according to tracer stylus dictates, however starts acceleration of motion in the opposite or downward direction to actuate the friction direction switch of the direction acceleration brake switch 210 thereby releasing the braking torque of brake 290 as the switch circuit is closed.

The cycle of motion change from an upward to a downward velocity has thus been followed through. A change of motion in the reverse order according to the tracer stylus demand follows the same sequence of events with the same attendant braking actions during deceleration periods.

The tracer vibrator circuit of Fig. 4 is different from that shown in Fig. 3 in that the voltages for this circuit are taken directly from the generator output rather than from a reversible voltage drop in phase with the generator current. Thus immediately after an increased deflection of the tracer stylus 240 produces an "up" control current and a corresponding generator corrective voltage polarity is established to energize the "up" clutch 325, the magnetic field created by the energization of the coil 308 will attract the "up" contact armature and part the contacts. If the increased stylus deflection persists, the "up" vibrator circuit serves to instigate a series of "up" control currents, each separate and distinct from the other and anticipatory in nature to preclude over correction of the stylus deflection, until the tracer stylus is returned to a predetermined neutral position, rather than permit a sustained corrective current which would subside only after correction is attained with consequent over-correction.

Likewise if the tracing stylus 240 is released to allow a return to a neutral position and beyond, a "down" electric control current will result and a corresponding generator corrective voltage polarity output will be created. This generator voltage, serves primarily to cause corrective current flow in the "down" clutch 326 and through torque effort effect a downward movement of the attachment frame 233. The generator voltage also serves to energize the anticipatory circuit to move the "down" contact 259 away from the movable tracer contact 256. A continued deflection of the tracer stylus in this direction will instigate a series of distinct "down" control currents each resulting in a separate downward torque effort on the screw 285 to secure downward movement of the attachment frame until the predetermined neutral position of the tracer stylus is re-established.

Figures 5, 6:
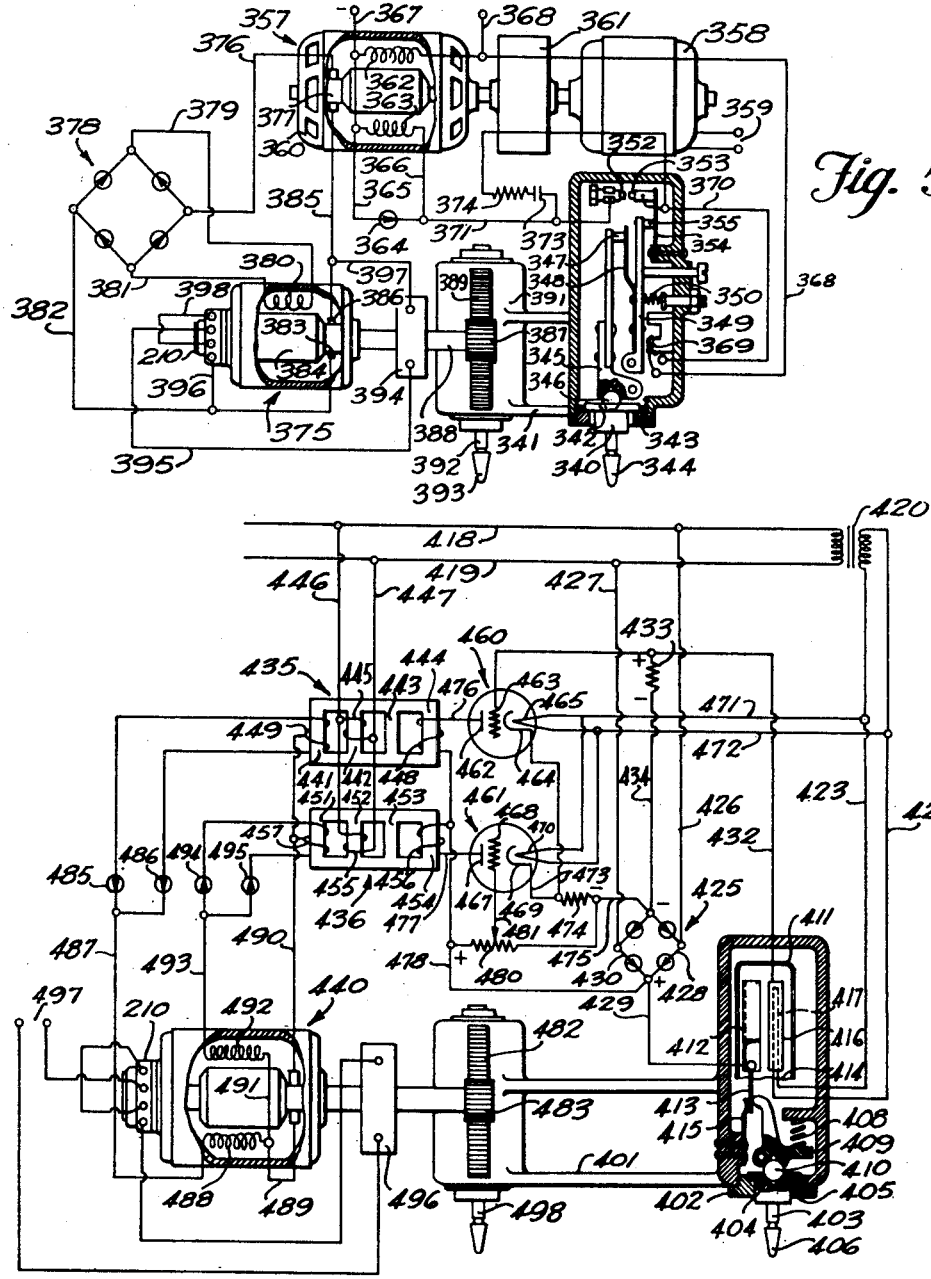
Fig. 5 is another schematic circuit diagram showing a modified form of the invention in which the tracer is arranged to control the frequency of interruption of a control circuit for regulating the action of the feeding mechanism.
Fig. 6 is another schematic circuit diagram showing a modification of the invention in which the tracer is arranged to actuate a movable element of an electronic tube, the power for feeding movements being derived from saturable core transformers controlled from the electronic tube.

Another variation of a reversible polarity tracer system is shown in Fig. 5. This variation may well be referred to as the "opposed generator field" type. In this case also the tracer stylus and cutter are both mounted on a single movable frame. They therefore move unitarily in an upward or downward direction in the manner explained in connection with Fig. 3. The means of mounting the frame for vertical movement is not shown since any of a number of well known means may be used.

A tracer stem 340 is swivelably mounted in a frame 341 by means of a flange 342 and a flange seat 343. A tracer stylus 344 is retained on the lower end of the stem 340 for operable association with a pattern that may be clamped on a work table in a manner previously described. A vertically disposed bell-crank 345, having a recess centrally located on the bottom face thereof to match a recess on the upper end of the tracer stem 340 which serve as retainer sockets for a ball 346, is adapted to transmit any movements of the tracer stylus 344 to control the position of contacts in the electrical control circuit. A pin 347 on the upper end of bell-crank arm 345 serves as a movable abutment to contact a leaf spring 348 carried by a pivotally mounted armature lever 349 which is normally biased for movement toward the vertical arm of the bell-crank 345 under the action of a coil spring 350. In addition to serving as a bias to urge the armature spring 348 into pressure contact with the pin 347, the spring 350 serves to retain the operating members associated with the stylus 344 in pressure contact with each other.

The electrical circuit is established between two contacts, namely an insulated stationary contact 352 attached to the frame 341 and an insulated movable contact 353 affixed to a flexible leaf spring 354, which is fastened to the stationary frame 341. The spring 354 normally tends to retain contacts 352 and 353 together, however, this action is controlled by the pressure contact of an abutment 355 mounted adjacent to the free end of the armature lever 349. A motor-generator set 357 is used to power amplify the control currents created by the action of the tracer contacts 352 and 353 in terms of corresponding output corrective currents. A motor 358 is connected to an appropriate supply source 359. Intermediate the motor 358 and a generator 360, a flywheel 361 is keyed to the interconnected shafts of the two units. This flywheel tends to eliminate variations in speed normally encountered in the operation of a motor-generator set.

Two field windings are contained within the generator, namely, a shunt field winding 362 and a control field winding 363. The control field winding 363 is shunted by a rectifier 364 through connecting lines 365 and 366 to provide a path for control field winding relaxation currents and protect the tracer contacts 352 and 353 from excessive sparking. A common negative feed line 367 is connected from one end of each of the two field windings 362 and 363 to an appropriate direct current supply source. The positive side of the supply source is connected to the shunt field winding 362 and the movable contact 353 of the tracer mechanism through a line 368, a tracer electromagnet coil 369, and a line 370. Line 366 and a line 371 conduct the control current from the stationary tracer contact 352 to the generator control field winding 363.

Full control current thus passes through the electromagnet coil 369 to effect vibratory movement for contact 353. The "atonic" type vibrator provides means for effectively regulating the control current as the frequency of vibration is varied by tracer stylus change of armature biasing through action of the pin 347 on the spring 348.

A condenser 373 is connected to the line 371 and to the line 370 through a resistor 374 and is thus parallelly connected with the tracer contacts 352 and 353. This condenser and resistor serve to minimize sparking and arcing across the tracer contacts.

An upward slope in the contour of a given pattern encountered while tracing will increase the deflection of the tracer stylus 344 following a given path over the pattern which, in turn, will cause a reduction in the frequency of vibration of the movable contact 353 as the armature lever 349 is attracted and released by the control current passing through the electromagnet coil 369 with a consequent diminution in the magnitude of control current. However, if the pressure on the tracer stylus 344 is released, as would be the case if a downward slope of the pattern was encountered while tracing, the frequency of vibration of the movable contact will increase with a consequent increase in the magnitude of control current. This modulated control current governs the polarity and strength of the generator field to regulate the generator output corrective current as to polarity and magnitude.

The shunt field winding 362 is energized from the supply source to establish a constant magnetomotive force for the generator field, to control the output corrective current and consequent feed motor torque for upward travel of the tracing attachment. The control field winding 363 is energized from the same supply source but through the tracer contacts 352 and 353. Thus, if the deflection of the tracer stylus 344 is increased during a tracing operation, the frequency of vibration of the contacts will be reduced and the bucking magnetomotive force of the control field winding 363 counteracting that of the shunt field winding 362 will be reduced so that the shunt field magnetomotive force will predominate to establish a net field strength and govern the output current polarity to effect feed motor torque for upward motion.

Likewise, if the stylus 344 is released at a given point due to a change in the pattern slope, the frequency of the contact vibration will be increased and the bucking magnetomotive force of the control field winding 363, counteracting that of the shunt field winding 362, will be sufficiently strong to predominate over the magnetomotive force of the shunt field winding and establish a net field strength for governing the magnitude of the opposite polarity output corrective current of the generator to effect feed-motor torque for downward motion. When the deflection of the tracer stylus is such that the effect of the control field winding 363 is exactly equal and opposite to the effect of the shunt field winding 362, the respective magnetomotive forces of the two field windings will be balanced and no upward or downward motion will result. The governing action of the generator net field is proportional to the amount of tracer stylus deflection and the result of such net field control will always be to increase or reduce this deflection to a predetermined balanced position.

A series feed-motor 375 is disposed to effect the vertical positioning of the tracer mechanism and cutter spindle retained within the slidable frame 341. A line 376 connected to one terminal brush of the generator armature 377 and to a bridge rectifier 378, conducts the output corrective current from the generator to the motor 375 for effecting torque to give upward movement to the tracer mechanism. The generator output corrective current passes through the upper branch of the rectifier 378 to a line 379 connected to a field winding 380 within the motor 375. A line 381 from the field winding 380 reconnects with the rectifier 378 wherein the current flows through the lower branch and a line 382 to the motor armature brush 383 and the armature 384. To complete the circuit, a line 385 connects with an armature brush 386 of the motor 375 and with the other terminal brush of the generator armature 377. Current flow through the feed motor 375 in this direction will set up a torque tending to rotate a pinion 387 keyed directly to shaft 388 of the armature 384 in direction to elevate the tracer attachment 341 under the action of a rack 389.

If the generator output corrective current polarity is such as to effect feed-motor torque for downward feed motion, the corrective current will originate in the generator armature 377 and flow through the line 385, the motor armature brush 386, the motor armature 384, the armature brush 383 and the line 382 to the bridge rectifier 378. From this point the corrective current flows through an upper branch of the rectifier, the line 379, the motor field winding 380, the line 381 to the rectifier, a lower branch of the rectifier and the line 376 to the generator armature 377. With this generator output current polarity, the direction of torque exerted by the motor armature 384 is such as to rotate the shaft 388 and the pinion 387 in direction to impart a downward motion to the tracer mechanism and cutter spindle mounted on the frame 341. In each case the bridge rectifier 378 serves to maintain a unidirectional corrective current flow through the motor field winding 380 while the corrective current flow through the armature is reversed.

A motor 391 enclosed in the tracer frame 341 is directly connected to drive a cutter spindle 392. An electrical supply source variably controlled by appropriate switches (not shown) serves to effectively vary the speed of the motor and consequently the speed of the cutter spindle 392 and a cutter 393.

A direct acting brake 394 suitably mounted to act on the motor armature shaft 388 serves to apply a modulated braking torque to the shaft in proportion to the corrective current which accomplishes decelerating feed motor torque. A line 395 extends from the direct acting brake 394 to a terminal on the direction-acceleration brake switch 210 and then from another terminal thereof, a line 396 leads to the line 382 while a line 397 extends from the brake 394 to the line 385. Two other terminals of the brake switch 210 are joined by a jumper conductor 398.

The mechanical and electrical action of the direct action brake 394 is different from that previously described in connection with the brake shown in Figs. 2, 3 and 4. The present type of brake 394 is normally in a non-braking position and is designed to exert braking torque during a decelerating feed-motor torque. The brake is connected to the generator output circuit in such manner that the brake is electrically energized to effect braking action whenever the brake switch 210, mounted on the drive shaft 368 operates to close the electrical contacts therein and complete the brake circuit. Switch 210 with the connections shown operates to complete the brake circuit during all decelerating periods regardless of the direction of feed drive.

Since the brake electrical supply source is taken from across the feed motor armature brushes 383 and 386 the brake current is of varying magnitude in proportion to the feed motor current and torque. This brake current affords a braking torque of magnitude corresponding with feed motor decelerating torque as established by the modulating type tracer through generator field control. The magnitude of the braking torque and feed-motor decelerating torque varies directly as the tracer stylus deflection. The mechanical opening of the brake switch 210 disconnects the brake from its electrical supply source to operatively release it for all feed-motor accelerating torques.

The previously described reversible polarity tracer systems involved the use of a motor generator set or electronic power amplifiers for the purpose of converting the tracer control currents into corresponding corrective electric currents capable of controlling the action of the feed drive motor. However, another specific form of power amplifier known as a saturable core transformer may be used in a like manner with similar results. An electrical circuit incorporating these transformers for the purpose of tracer control is shown in Fig. 6.

Both the tracer and the cutter mechanism are mounted on a single frame 401 which may be appropriately retained for vertical movement on way surfaces in the manner shown in Figs. 3 and 4. The tracer mechanism is enclosed in a protective casing 402. A tracer stem 403 is movably retained in the casing 402 by means of a flange 404 on the stem and a flange seat 405. The tracer stylus 406 fastened to the bottom end of the stem serves to operably engage a pattern to be copied, as shown in Figs. 1, 2 and 3. Any movement of the tracer stylus and stem serves to actuate the tracer mechanism. A spring 408 serves to counteract the axial pressure imparted to the tracer stem by the engagement of the tracer stylus 406 with the pattern and maintains a retentive pressure on a bell-crank 409, a ball 410 and the stem 403. A slight axial movement of the tracer stem is transmitted to the pivoted bell-crank 409 through the ball retained between the upper end of the tracer stem and the bell-crank.

A vacuum tube 411 is fixed within the tracer casing. The tracer mechanism serves to actuate a movable anode 412 within the tube. The vertically extending arm of the bell-crank 409 is designed to abut a pivoted actuating rod 413 supporting the anode 412 and protruding from the bottom of the tube through a flexible diaphragm 414. A leaf spring 415 rigidly fastened to the casing 402 urges the actuating rod 413 into constant operable engagement with the vertical extension of bell-crank 409. A rectangular box-shaped hollow cathode 416 and a heater 417 enclosed therein are mounted in spaced relationship to the anode 412 which is of U-shape or channel shape and is slightly larger than the cathode. Therefore, a movement of the actuating rod 413 will cause the anode 412 to move sidewise and partially enclose the cathode or be withdrawn therefrom and, consequently, will cause a change in the effective areas of the anode 412 and cathode 416 as well as change the spacing between the two.

An alternating current supply source is used to furnish electrical energy. A pair of feed lines 418 and 419 are connected to a primary winding of a step-down transformer 420. A secondary winding in the transformer 420 is connected to the electronic tube heater 417 by two lines 422 and 423. Heating the cathode 416 a desired amount will result in a constant emission of electrons from the surface of the cathode. The number of electrons which actually reach the movable anode 412 will depend on the areas presented by and the spacing between the anode and the cathode at a given instant.

A suitable bridge rectifier 425 connected to the alternating current supply source furnishes a direct current supply for the electrical control circuit. The rectifier is supplied from the two feed lines 418 and 419 through lines 426 and 427, respectively. The input current flow follows the line 426 from the feed line 418 through the lower branch 428 of the rectifier 425 and a line 429 to the movable anode 412 in the vacuum tube 411 during a given half cycle. During the subsequent half cycle, the current flow is from the feed line 419 and the line 427 through a lower branch 430 of the rectifier 425 to the line 429 connected to the anode 412. Within the tube, the actuation of the anode by the action of the tracer stylus 406, to which it is mechanically linked, serves to effect a corresponding variation in tracer current flowing from the anode 412 to the cathode 416. The path for tracer current flow from the cathode back to the negative terminal of the bridge rectifier 425 is completed through a line 432, a resistance 433, and a line 434.

Two saturable core transformers 435 and 436 are used in this tracer system in place of the motor-generator set used in the previously explained circuits. The substitution of transformers in place of the generating set is advantageous in that all moving parts are eliminated. The two transformers are identical in design, one being adapted to afford control for the "up" corrective currents while the other is adapted to afford control for the "down" corrective currents necessary to govern the torque effort of a feed drive motor 440 mechanically connected to effect the vertical positioning of the tracer frame 401. The transformer 435 will therefore be referred to as the "up" transformer and transformer 436 will be known as the "down" transformer.

Referring more specifically to the "up" transformer 435 the core thereof is made up of a plurality of laminations including four spaced legs 441, 442, 443 and 444. The various coil windings are disposed on the four legs. A master winding 445 is mounted on the intermediate leg 442 and connected to the feed lines 418 and 419 by two lines 446 and 447 respectively. A control winding 448 wound on the leg 444 serves to receive the control current that results from the tracer current flowing in the tracer circuit. An output winding 449 is disposed on the leg 441 of the transformer.

Likewise the laminated core of the "down" transformer 436 consists of a plurality of laminations including four spaced legs 451, 452, 453 and 454. A master winding 455 is wound on the transformer leg 452 and electrically connected to receive power from the feed lines 418 and 419 via the two lines 446 and 447. A control winding 456 is wound on the leg 454 and an output winding 457 is disposed on the leg 451 of the transformer 436.

Two triode tubes 460 and 461 are used in the control circuit. The tube 460 is adapted to function in connection with the "up" transformer 435 and includes an anode 462, a control grid 463, a cathode 464 and a heater filament 465. The second tube 461 functions in connection with the "down" transformer 436 and includes an anode 467, a control grid 468, a cathode 469 and a heater filament 470. Both heater filaments 465 and 470 are electrically connected in parallel to the supply lines 422 and 423 through two leads 471 and 472. The two cathodes 464 and 469 are connected together by a line 473 which in turn is joined to a cathode bias resistance 474. A line 475 serves as a return circuit and connects the bias resistance 474 to the negative side of the bridge rectifier 425.

The anode 462 in the tube 460 is connected to one end of the control winding 448 of the "up" transformer by a line 476 while the anode 467 in the tube 461 is connected to one end of the control winding 456 of the "down" transformer 436 by a line 477. The other end of each of the control windings 448 and 456 are attached to a line 478 which in turn is connected to the positive side of the bridge rectifier 425. A resistance 480 is disposed to function between the line 475 and the line 478 as a voltage divider with a line 481 adjustably connected intermediate its ends to supply a fixed voltage for grid 468 in the tube 461.

Movement of the attachment 401 is accomplished through the cooperating relationship of a rack 482 secured on the attachment frame 401 and a pinion 483 keyed to the shaft of the polarity-conscious feed motor 440. The control circuit for this motor originates in the output windings 449 and 457 in the two transformers 435 and 436 respectively.

The ends of the output winding 449 on the saturable leg transformer 435 are respectively connected to the rectifiers 485 and 486 and direct the current flow from the output winding, as indicated by the arrows within each of the rectifiers to a line 487 supplying a feed-motor field winding 488. The other end of the field winding 488 is connected by means of a line 489 to an armature brush terminal in the feed motor 440. The other brush terminal therein is connected by a line 490 to a central tap on the output winding 449 to complete the circuit. The corrective current from the "down" transformer 436 flows from a central tap of the output winding 457 into line 490, thence through the feed motor brush terminals and the armature, through line 489 and a line 491 to one end of a field winding 492 in the motor 440. The other end of the winding 492 is connected by a line 493 to a pair of rectifiers 494 and 495 which in turn are connected respectively to opposite ends of the output winding 457.

A direct acting brake 496 is disposed to function on the shaft of the drive motor 440 in the same manner as was previously described in detail in connection with the brake 394 in Fig. 5, except that the electrical supply source for brake control is independent of the tracer control and is constant. Thus a separate power source 497 is provided for the brake 496 and the brake switch 210 with the electrical connections identical to those shown in Fig. 4. A cutter spindle and cutter 498 are effectively operated at a given cutter speed by a motor (not shown) built into the frame 401 and appropriately controlled by means of electrical switches.

Reverting to the functions of the reversible polarity tracer system as shown in Fig. 6, it is evident that any variations in the contour of the pattern will cause corresponding deflections of the tracer stylus 406 when operating over a given path and engaging the pattern. The tracer stylus, in turn, mechanically actuates the movable anode 412 in the tube 411 and provides the only means of setting up electrical oscillations in the control system. The tracer current flow from the anode 412 to the cathode 416 of the tube is varied accordingly and the resulting voltage variations across resistance 433 is transmitted to the grid 463 of the tube 460. While the voltage of the grid 463, relative to the negative terminal of the direct current source, in the present instance the bridge rectifier 425, is varied according to the dictates of the tracer stylus, the voltage of the grid 468 relative to the direct current source is held constant as determined by the voltage divider resistance 480.

With the stylus 406 in a neutral position to establish a balanced condition for zero feed motor torque, the tracer current flowing through resistance 433 determines a certain positive voltage for grid 463 of tube 460 relative to the supply source negative line 434. This positive voltage will be approximately equal to or greater than a positive cathode bias voltage drop across resistance 474 as established by the sum of the two control currents flowing through the common line 473 from cathodes 464 and 469, through resistance 474, to negative line 434 of the supply source. For this balanced condition, the grid 468 of tube 461 will also have a positive voltage adjustably fixed at the voltage divider resistance 480 relative to the supply source negative line 434, which exactly equals that of grid 463 of tube 460.

The positive voltage of the grids 463 and 468 in excess of the positive voltage drop across the cathode bias resistance 474 represents the net grid voltage, relative to cathode, for each of the tubes and determines the magnitude of the equal control currents flowing from each cathode for the balanced condition described. Also, the magnitude of equal control currents for this balanced condition may be changed by manually adjusting the voltage of grid 468 to a new setting at the voltage divider resistance 480 since the grid 463 will automatically have its voltage adjusted to equal that of grid 468 by readjustment of stylus deflection.

As the voltage of grid 463 is made more positive by a deflection of tracer stylus 406 to increase the tracer current through resistance 433, the control current flowing from cathode 464 of tube 460 increases to effect an increase in the total net control current flowing through resistance 474. The resulting increase in positive cathode bias voltage measured across resistance 474 leaves the grid 468 of tube 461 at a less positive voltage, relative to its cathode 469, to decrease the control current flowing from the cathode 469. While the control current through tube 460 increases, and that through the tube 461 decreases, their sum establishes a total net control current which is greater than that flowing prior to deflection of the stylus 406.

This operation described for a deflection of stylus 406 holds true in the opposite sense for a release of stylus deflection to less than the neutral position earlier described, with the grids 463 and 468 changing voltage in push-pull fashion, relative to their respective cathodes 464 and 469, to cause corresponding changes in the control currents flowing from these respective cathodes. Such a direct current amplifier is zero frequency responsive in that no matter how slowly the stylus 406 may change deflection, the amplified control currents flowing from the cathodes 464 and 469 to the transformer windings 448 and 456, respectively, will faithfully respond.

While the control and output windings in the transformers 435 and 436 are balanced for zero feed motor torque, the master windings 445 and 455 in the transformers when energized from the alternating current feed lines 418 and 419, set up an alternating magnetic flux in the leg 442 of the transformer 435 which branches for return through the legs 441 and 443, while another alternating magnetic flux is set up in the leg 452 of transformer 436 which branches for return through the legs 451 and 453. However, if the control current flowing in the control winding 448 of transformer 435 is caused to increase in magnitude, a constant polarity flux flowing through the legs 443 and 444 of the transformer will increase proportionately, and force the alternating magnetic flux in the leg 443 to change its path of travel more completely to the legs 441 and 442 because of the increased reluctance of leg 443 when it becomes more saturated with the constant polarity flux flowing through the leg 444. The electromotive force set up in the output winding 449 will alternate with the same frequency as the alternating current supply source.

Likewise, in the case of transformer 436, a control current of greater magnitude flowing in the control winding 456 will cause a constant polarity magnetic flux to flow through the legs 453 and 454 of the transformer 436 to increase proportionately and force the alternating flux into a new path of travel with a greater portion thereof flowing through the leg 451 and a lesser portion flowing through the leg 453 of the transformer as before described. The electro-motive force induced in the output winding 457 will alternate at the same frequency as the alternating flux set up by the energization of the master winding 455.

The output from each of the windings 449 and 457 of the two transformers 435 and 436 is controlled by the rectifiers in such a manner that the flow of current from each one is unidirectional and occurs only during the respective half cycles. These two transformer outputs are utilized in rectified corrective current form to energize a polarity-conscious feed motor 440, mechanically connected to feed the tracer assembly in an upward or downward direction. The direct acting brake 496 functions to brake the feed motor 440 in either direction of rotation whenever a reversed feed-motor torque initiates deceleration. In this manner a series of driving and braking forces are imparted to the tracing attachment so that each stylus deflection is corrected to maintain a neutral position thereof.

The direction and acceleration responsive brake control switch 210, previously referred to in connection with Figs. 2, 3, 4, 5 and 6 includes a housing 500 containing a bearing shaft 501 on which rotatable members 502 and 503 are securely pinned for unitary rotation as shown in Figs. 7 and 8. A second bearing for shaft 501 is provided with an insulator enclosure panel 504 secured in a counterbore in the housing 500 which seals the contact elements from dirt and foreign matter and provides structure for mounting a series of radially disposed brush assemblies 506. Inspection cover plates 507 and 508 seal the end openings in the housing 500 to completely enclose the switch parts. The shaft 501 extends from the housing and is coupled with the tracer feed motor shaft extension, such as shaft 71 in Fig. 2, for integral rotation therewith.

Securely fastened to the insulation member 503 are four separate adjustable contacts 509, 510, 511 and 512. The two contacts 511 and 512 are oppositely disposed to engage alternately with a double-faced contact 513 retained in a rotatable friction ring 515 of electrical insulation material. Tapered portions of ring 515 curve to form the open C shape of the ring and give it resilient properties to operably position the ring in a bore provided in the housing 500 and to maintain a slight radial pressure on the bore for frictionally resisting any rotation imparted to the ring through engagement between either of the contacts 511 and 512 and the contact 513. The friction between ring 515 and housing 500 thus permits the electrical disengagement relative to one and the electrical engagement with the other of the contacts 511 and 512 by the contact 513 as the member 503 and shaft 501 reverse direction of rotation, and provides the necessary restraint to cause contact pressure for electrical current flow during rotation.

The other two contacts 509 and 510 on the member 503 are oppositely disposed from the two contacts 511 and 512 and engage alternately with a double-faced contact 516 that is movable with an inertia mass 517 on a flexible mounting blade 518 which supports the inertia mass 517 and is anchored in the member 503. Inertia mass 517 rotates with the member 503 and shaft 501 and is permitted freedom by the flexible blade 518 to move the contact 516 out of electrical engagement with the one and into electrical engagement with the other of the two contacts 509 and 510 as the rotative speed of the member 503 and shaft 501 is increased or decreased relative to that of the mass 517 by an acceleration or a deceleration (plugging) torque from the tracer feed motor. In the switch structure shown, the flexible blade 518 centers the contact 516 between the contacts 509 and 510 to maintain the contacts electrically open when the rotary speed of inertia mass 517 and that of the member 503 is constant and exactly the same (zero speed or stand still included).

Jumper wires electrically connect the contacts 510 and 511 together through a common conection with a collector ring 519 recessedly retained in the face of the rotatable member 502 and which in turn is connected with a terminal 520 mounted in an insulator 521 attached to the housing 500 through a brush 522 operably biased by a spring 523 to ride on the ring 519, a brush holder 524, a nut 525 and a spring connector 526 clamped to the holder 524 and to the terminal 520. Contacts 509 and 512 are likewise electrically connected together through common connection with a collector ring 527 by means of jumper wires, and further operably connect with a terminal 528 by means of other brush facilities mounted on the insulator enclosure panel 504 in manner similar to that just described.

The contact 516 associated with the inertia mass 517 is connected by a jumper wire 529 with the collector ring 530 imbedded in the member 502 which, in turn, is engaged through a brush assembly 506 to electrically connect with a terminal 531 by brush means as described before. The contact 513 associated with the friction ring 515 likewise is connected through a jumper 532 with a collector ring 533. A brush assembly appropriately disposed on the panel 504 serves to afford current passage means to a terminal 534.

Operation of the acceleration-deceleration switch electrically reflects the transient mechanical dynamic condition of the feed motor shaft extension and the switch shaft 501 connected therewith. Control by this switch is the result of the combined functioning of two separate subswitching structures; that structure associated with inertia mass 517 which is sensitive to velocity change (acceleration or deceleration); and that structure associated with the rotatable friction member 515 sensitive to direction of rotation. By making external circuit connections only with the terminals 531 and 534 and by omitting all connections with or between terminals 520 and 528, a first style of acceleration-deceleration switching is afforded (see Figs. 2, 3 and 4). By jumper connecting the terminals 531 and 534 together and by making external circuit connections with the terminals 520 and 528 a second style of acceleration-deceleration switching is afforded (see Figs. 5 and 6).

In the first style of switching above mentioned wherein terminals 531 and 534 are used, the electrical switch circuit between these terminals is open or broken whenever a decelerating feed motor torque causes the member 503 and shaft 501 to lose rotary speed in either direction of rotation; however the electrical switch connection is completed between the terminals whenever the feed-motor torque is accelerating or increasing the rotary speed of member 503 and shaft 501. When the member 503 and inertia mass 517 have the same rotary speed including zero speed or standstill, the circuit between the terminals 531 and 534 is open due to the centering or contact opening action of the flexible blade 518. This style of control switching is especially desirable for use with the reverse action type of brake.

For said first style of switching an open circuit condition between the terminals 531 and 534 during a deceleration period when the shaft 501 is rotating clockwise will not permit a current flow from the terminal 534 through the brush assembly means to the collector ring 533, the contact 513, the engaged contact 512, and the collector ring 527 to the contact 509, since at contact 509 the circuit will be broken and the terminal 528 and brush assembly associated with the collector ring 527 is not in use. Even though engagement would occur between contacts 510 and 516, the switch circuit between the terminals 531 and 534 could not be completed. When rotation has been decelerated to standstill, the contact 516 disengages from contact 510 by reason of the centering action of the flexible blade 518, and in no way disturbs the open switch circuit between terminals 531 and 534 just described.

For said first style of switching, having completed the deceleration period of clockwise rotation as described, let us suppose that the feed motor torque accelerates the shaft 501 in a reverse or counterclockwise direction causing it to gain rotary speed. The mass 517 will then, due to its inertia, effect engagement between contacts 510 and 516 and the reversed rotation will then drive the friction ring 515 counterclockwise and cause the contact 513 to disengage from contact 512 and to engage contact 511. Now in tracing the circuit between terminals 531 and 534 it will become evident that a closed switch circuit condition exists. The brush associated with terminal 534 connects with the collector ring 533 and permits current flow therefrom through the contact 513, the contact 511, the ring 519, the contact 510, the movable contact 516, the brush assembly associated with the collector ring 530, and finally to the terminal 531 to complete the circuit.

In order to complete one cycle, a succeeding counterclockwise deceleration period will occur and then a clockwise acceleration period will follow to return to the dynamic starting point. A description for these two succeeding periods of the cycle parallels that given for the first two periods except in a reverse sense so that relative engagement and disengagement between the contact occurs oppositely for respectively opposite rotations. The electric switch circuit conditions between terminals 531 and 534 correspond respectively with those described for the first two portions of the cycle.

The second style of acceleration-deceleration switching, wherein the terminals 531 and 534 are jumper connected together leaving terminals 520 and 528 for external circuit connection, provides that the switch circuit between the terminals 520 and 528 be normally open under all conditions excepting for a condition of deceleration of the shaft 501 in either direction of rotation, at which time the switch circuit would be closed or continuous between these terminals. This style of switching is desirable for use with the direct acting type of brake indicated in Figs. 5 and 6.

The closed circuit condition between the terminals 520 and 528 during the deceleration period of clockwise rotation of the shaft 501 may be traced from the terminal 528 through its brush connecting means with the collector ring 527 to the contacts 512 and 509. Since contact 509 is not engaged, the circuit path continues through engagement between the contacts 513 and 512, to collector ring 533, the terminal 534, an external jumper connector to terminal 531, the collector ring 530, the contact 516, the engaged contact 510, the collector ring 519 and finally the terminal 520. When rotation has been decelerated to standstill the contact 516 disengages from contact 510 to break or open the switch circuit between terminals 520 and 528.

Having completed the deceleration period as just described, let us suppose that the feed-motor torque accelerates the shaft 501 in a reverse or counterclockwise direction causing it to gain rotary speed. The inertia mass 517 will then, due to its inertia, effect engagement between contacts 516 and 510 and the reversed rotation will then drive the friction ring 515 counterclockwise and cause the contact 513 to become disengaged from contact 512 and to engage contact 511. In tracing the circuit between the terminals 520 and 528, it will be seen that an open switch circuit condition exists. The brush assembly associated with terminal 528 connects with collector ring 527 and the contacts 509 and 512. Since no contact engagement exists with contacts 509 or 512 the circuit path terminates for the normal open switch circuit condition between terminals 520 and 528. When the speed of rotation has reached maximum and no longer increases, the contact 516 parts from the contact 510 because of the centering action of the flexible blade 518 and yet does not affect the existing open switch circuit condition between terminals 520 and 528.

To complete this cycle, a succeeding counter-clockwise deceleration followed by a clockwise acceleration will occur to effect a return to the dynamic starting point. These two succeeding periods of the cycle parallels those described for the first two periods except in a reverse sense so that relative engagement and disengagement between the contacts occurs oppositely for respectively opposite rotations. The electric switch circuit conditions between terminals 520 and 528 for these last two portions of the cycle correspond respectively with those described for the first two portions.

The specific form of structure shown in Figs. 7 and 8 serves well to illustrate the principles involved, and is best suited for operation when the axis of shaft 501 is vertically disposed as shown in Figs. 3 and 4. Where the switch shaft rotation is about a horizontal axis as illustrated in the other figures, the preferred construction of brake switch 210 embodies an inertia mass in the form of a balanced flywheel (not shown) mounted for free rotation about the axis of shaft 501 and adapted to be driven by engagement between the contact 516, associated with the inertia fly wheel mass, and either of the contacts 509 or 510. The substitution of such a flywheel form for inertia mass 517 permits functioning of the brake switch 210 regardless of the axial position of shaft 501 and without gravity influencing switch performance.

Another alternate construction is provided when the flexible blade 518 is replaced with an overcenter spring arrangement (not shown) to insure that contact 516, associated with the inertia mass, is either in engagement with one or the other of contacts 509 or 510, rather than not in engagement with either of the two fixed contacts as shown in Fig. 7. By proper connections with the terminals 520, 528, 531 and 534 of switch 210 (no electrical circuit shown), this alternate biasing construction for the inertia mass 517 and contact 516 just described, allows the predetermined substitution of a reverse action type for a direct action type brake or vice versa to obtain the brake control desired (normally brake on-off to accelerate; or normally brake off-on to decelerate) for the particular operation.

The operation of the inertia mass switch, comprising inertia mass 517, flexible blade 518, member 503 keyed on shaft 501, movable contact 516 and the contacts 509 and 510, is dependent on relative change in rotary speed between the inertia mass 517 and member 503, so it becomes apparent that acceleration or deceleration, also referred to as a rate of speed change, imparted to shaft 501 by the feed motor is the source from which the inertia mass switch is operated. The acceleration or deceleration of shaft 501 is common with that of the feed-motor armature and is directly proportional to torque and hence magnitude of feed-motor corrective current.

With polarity of the feed motor corrective current corresponding to direction of rotary torque, as well as to tracer demand for a certain direction of correction, advantage is taken of the actual direction of rotation of the feed motor as indicated by the friction-direction switch of the brake switch 210, to differentiate or determine whether a particular feed-motor torque at the moment is decelerating (plugging) or accelerating. This utilization of tracer indicated and initiated feed motor corrective current accomplishes the part played by the inertia-mass switch of brake switch 210 to the end that the inertia-mass switch need not be used. The acceleration-deceleration brake control thus can be accomplished by this later described method wherein acceleration or deceleration corrective current, as indicated, necessarily present by the tracer stylus deflection, in combination only with the friction-direction switch indication of direction of rotation, and the combination acts to detect and differentiate between periods of acceleration or deceleration. The method referred to is shown illustrated in different forms in the Figs. 9, 10 and 11.

In Fig. 9, the reversible polarity generator output corrective current from the tracer controlled generator flows through conductor 298 and a pair of parallelly connected rectifiers 299 and 300 respectively to the windings 302 and 305 of the feed motor 288. The other ends of the windings 302 and 305 lead through the armature 289, a line 540, a center tap resistor 541 and the line 304 connecting with the generator 272.

Brake control circuit take-off is made across the resistor 541 by a pair of conductors 542 and 543 leading to the terminals 520 and 528 of the brake switch 210 and by the conductor 544 connecting the center tap of resistor 540 and one end of an actuating coil 545 in a "normally closed contact" relay device 546 which may be of magnetic, electronic or other type. The other end of the relay actuating coil 545 is connected by a conductor 547 with a rectifier 548 and then by a conductor 549 with terminal 534 of the brake switch 210 to complete the relay actuating circuit.

An independent electric supply source furnishes energy for brake operation. A conductor 551 leads from the power source to the direct action brake 394 and a conductor 552 connects the brake 394 with one terminal of a normally closed contact 553 in the relay device 546. The other relay contact terminal is connected with the power source through a conductor 554 to complete the brake circuit. Thus when the relay actuating coil 545 is energized, the relay contact 553 is opened to electrically de-energize the direct action brake 394 for a mechanical braking action. Consequently braking action is effected through the friction direction switch, connected with terminal 534 of brake switch 210, closing the relay actuating circuit when the voltage drop across one or the other of the resistor halves is of such polarity whereby current flow is permitted by the rectifier 548.

For example, a decelerating (plugging) corrective current is established by tracer deflection through rectifier 300 to effect a feed-motor torque to oppose an existing downward velocity of cutter spindle and tracer sleeve. This downward motion is effected by feed-motor rotation of such direction that the friction direction switch of brake switch 210 maintains its contacts in position to effect a closed switch circuit between the terminals 520 and 534. Now corrective current flow in such direction as to pass through rectifier 300 for "up" feed-motor torque makes the terminal conductor 542 positive with respect to the center tap terminal of the resistor 541. Relay current however does not flow from terminal 534 of brake switch 210 through conductor 549, rectifier 548, and conductor 547 to the actuating coil of relay 545 because of its polarity, leaving the contact 553 closed, to secure mechanical braking of the brakes 394 for assistance in reducing the downward velocity of the cutter spindle and the tracer sleeve.

After downward rotation of the feed-motor 288 is reduced to standstill, the persisting feed-motor torque, maintained by corrective current flow according to the yet unsatisfied tracer deflection, causes a reversal of feed-motor rotation without brake restraint during the period in which the brake reaction arm travels through its small distance of lost motion, as previously described with reference to Fig. 2.

This first small interval of reversed feed-motor rotation for upward travel of the cutter spindle and the tracer sleeve results in a contact shift in the friction direction switch of brake switch 210 to open the switch circuit between terminals 520 and 534 and to close the switch circuit between terminals 528 and 534, as described in connection with Fig. 7. The friction direction switch operation has then reversed the polarity of terminal 534 to initiate relay current since rectifier 548 will pass current when terminal 534 is positive. Energization of the relay coil 545 effects the opening of its normally closed contact to electrically de-energize the direct acting brake 394 for mechanical brake release, so that the now accelerating feed-motor torque can increase rotary speed in the reversed direction unimpeded by braking torque.

Reversed feed-motor rotation is accompanied by upward travel of the cutter spindle and tracer sleeve to satisfy stylus deflection and return to the dynamic condition existing prior to the stylus being deflected. The velocity of upward travel at this instant of tracer stylus satisfaction is less than it was on the previous downward trip because the braking torque acting in unison with the feed-motor decelerating torque reduces velocity quicker than feed-motor torque acting alone can increase velocity (accelerate) with the result that the distance of overtravel for each downward and upward excursion of the cutter spindle and tracer sleeve is reduced and the oscillation dies out or damps to effect a standstill condition with the brake set when the pattern is held fixed relative to the stationary tracer attachment frame (see Fig. 3).

The cycle of operation following a tracer stylus deflection release beyond the neutral stylus deflection occurs exactly as before with corrective current flowing in the opposite direction through the feed lines 298 and 304 and through the rectifier 299. In this case the circuit between terminals 528 and 534 of the friction direction switch in brake switch 210 is closed during a deceleration period when brake 394 acts to assist deceleration.

Another variation of the application of a friction direction switch is shown in Fig. 10. In this circuit, a positive conductor 560 and a negative conductor 561 connect with an appropriate direct current supply source. The positive conductor 560 connects with a brush 562 of the armature 289 in the feed-motor 288. The other or negative supply conductor 561 connects with a movable contact 563 within the tracer mechanism which is operably controlled by the action of the tracer stylus 240 on the pattern 241. The double-faced contact 563 is positioned to function between two stationary contacts 564 and 565. Contact 564 is connected to the "up" field winding 305 in the feed-motor 288 by a conductor 567 while the contact 565 is connected to the "down" field winding 302 in the feed-motor 288 by a conductor 569. The two field windings 302 and 305 are connected together by a common conductor 570 which also is attached to a second armature brush 571. Thus the armature 289 may be series connected with either of the field windings selectively.

The take-off for the brake control circuit originates at the conductors 567 and 569 connecting the contacts 564 and 565 with respective windings 302 and 305 in the feed-motor 288. A conductor 573 extends from the conductor 567 to one terminal of an actuating coil 574 in a normally open contact relay device 575 while another conductor 576 extends from the conductor 569 to the movable friction direction switch contact 513 via terminal 534 of the brake switch 210. A conductor 577 links one stationary contact 511 of the friction brake switch to a rectifier 578 which in turn is connected by a conductor 579 to the other terminal of the actuating coil 574. Likewise a conductor 580 links stationary contact 512 to a rectifier 581 which is also connected to the conductor 579. The rectifier 578 permits current flow from the contact 511 to the actuating coil 574, while the rectifier 581 permits current flow from the coil 574 to the contact 512.

An independent supply source is used to energize the brake 394, and is connected by a supply conductor 582 with a normally open relay contact 583. The cooperating relay contact also connects with the direct action brake 394 by means of a conductor 584. The circuit is completed by connecting a second supply conductor 585 to the brake 394. The relay contact 583 is opened to electrically de-energize the direct action brake 394 for a mechanical brake release whenever the relay actuating coil is de-energized. The friction direction switch provides a path through which the actuating coil 574 is energized to close the relay contact.

As shown in Fig. 10, the direction of the feed-motor torque will depend upon which of the two field windings is energized by the action of the tracer stylus. When a decelerating corrective current is established by tracer deflection to produce a feed-motor torque to counteract an existing downward velocity of the cutter spindle and tracer sleeve, the friction direction switch will be rotatively urged by the feed motor rotation into a position to maintain the closed switch circuit between the terminals 528 and 534 of the brake switch. The relay actuating current will then flow through conductor 573, the actuating coil 574, the conductor 579, the rectifier 581, to the closed contacts 512 and 513, and thereafter through the conductor 576 to the conductor 569 to complete the circuit. Excitation of the coil 574 effects a closure of the relay contacts 583 to electrically energize the direct action brake and mechanically engage the same.

In this manner the rotation of the feed-motor 288 is halted and thereafter the feed-motor torque set up by the corrective current flow according to the unsatisfied tracer deflection will cause a reversal of the feed-motor rotation. At this instant the brake is not effective since the brake reaction arm is free to travel during the small interval of lost motion and the position of the friction direction switch is reversed. The actuation of the friction direction contacts in the brake switch 210 will instantly open the brake control circuit through an opening of the relay contacts 583 which in turn will cause an electrical de-energization of the brake 394 to secure a mechanical brake release and permit free travel of the cutter spindle and tracer sleeve. During the subsequent acceleration caused by the persisting corrective current, feed-motor rotation for upward travel of the cutter spindle and tracer sleeve will occur and maintain the reversed engagement of the friction direction contacts of brake switch 210 with the circuit closed between its terminals 520 and 534. This closed circuit path through terminals 520 and 534 of brake switch 210 however does not pass current to re-energize the brake relay since the rectifier in this path will permit current flow only when the opposite tracer contact effects a change of polarity of the brake control source. Thus the feed-motor can increase rotary speed in the reversed direction until the tracer stylus is satisfied to terminate the corrective current.

A third variation in the application of a friction direction switch to a tracer control circuit is shown in Fig. 11. A motor 586, including parallelly connected armature and field windings, is connected to a supply source through two conductors 587 and 588, and is mechanically coupled to drive an armature 589 of a generator 590. One generator field winding 591 is connected to an appropriate supply source and to an "up" fixed contact 564 of a tracer mechanism by a conductor 592 while a second field winding 593 is connected to the supply source and to a "down" fixed contact 565 of the tracer mechanism by a conductor 594. The tracer mechanism consists of a tracer stylus 240 positioned for operation upon a pattern (not shown), a vertical tracer shaft to which the stylus is attached, a horizontally mounted contact bar which is linked to and actuated by the tracer shaft, a double-faced contact 563 fastened on the insulated end of the contact bar, and the two stationary contacts 564 and 565 each aligned for engagement with a face of the double-faced contact 563. The contact 563 is connected to the supply source by a conductor 595 to complete the tracer circuit. To reduce the sparking which would ordinarily occur each time the movable contact 563 engaged the contact 564 in the tracer mechanism, a condenser 597 in series with a resistance 598 is interposed between the conductor 592 and the conductor 595 in the tracer circuit. For the same reason a condenser 599 in series with a resistance 601 is connected between the conductor 594 and the conductor 595 in the tracer circuit.

The generator 590 serves to furnish a controlled output current for the cutter and tracer feed-motor 288. Output current is carried by a line 602 from a generator brush 603 to a resistance 604. A line 605 extends from the resistance 604 to a pair of rectifiers 606 and 607 which in turn are connected respectively to the ends of the pair of field windings 305 and 302 in the feed-motor 288. The purpose of the two rectifiers 606 and 607 is to render the circuit to the feed-motor 288 polarity conscious, that is, to effect a reversal of the feed-motor torque for each corrective current polarity change. Each of the field windings 302 and 305 are series connected with the armature 289 in the feed-motor 288 through a brush contact. A conductor 608 connects a second armature brush of the feed-motor with a resistance 609, the other end of which is connected, by a conductor 610, to a generator armature brush 611 to complete the circuit.

The tracer assembly is vertically positioned through torque imparted by the feed-motor 288 by way of drive means such as are shown in Figs. 2 to 6. Thus an output corrective current flowing from the generator armature brush 603 and passing through conductor 602 and rectifier 607 to the feed-motor 288 will produce a driving torque which will impart a downward motion to the tracer assembly and consequently bring the tracer stylus and cutter into contact with the pattern and work piece respectively. Conversely, an output corrective current flowing from the generator armature brush 611 and passing through conductors 610 and 608, the feed-motor 288 and the rectifier 606 will produce a driving torque which will impart an upward motion to the assembly. The polarity of the generator output corrective current determines the direction of the driving torque of the feed-motor 288 and is dependent upon the dictates of electric tracer control currents as regulated by the tracer mechanism according to the upward and downward movements of the tracer stylus as it traverses the pattern.

The means for braking the feed-motor to decelerate or reduce velocity is somewhat modified in this case but includes the friction direction switch of the brake switch 210 to achieve performance comparable with that of the systems shown in Figs. 9 and 10. The switch is mounted on the tracer attachment in such manner that the movable contact 513 thereof is motivated against either of the fixed contacts 511 or 512 by the rotation of the feed-motor 288 in either direction. Thus in Fig. 11, an interconnecting shaft between the feed-motor and the switch 210 will cause engagement between contacts 512 and 513 during an "up" travel rotation of the feed-motor, and an engagement between contacts 511 and 513 during a "down" travel rotation of the feed-motor. The movable contact 513 is connected to the conductor 610 by a conductor 613.

The fixed contact 511 serves momentarily to receive the "up" corrective current through engagement with the movable contact 513 in the instant following a polarity change in the generator output current which effects a deceleration of the "down" rotation of the feed-motor 288. The full strength of the "up" corrective current flows from the switch 210 through a conductor 614, a rectifier 615, a conductor 616 and the conductor 608 to the armature brush of the feed-motor 288. If the friction direction switch has been actuated by actual reversal of the motor, the continued flow of "up" corrective current must pass instead from the conductor 610 through the resistance 609 to the motor 288 during the interval in which the said motor is accelerated for "up" directional feeding. Likewise, the fixed contact 512 serves to momentarily receive the "down" corrective current through engagement with the movable contact 513 in that instant in which a polarity change in the generator output current seeks to effect a deceleration of the feed-motor 288 from a counter-clockwise "up" rotation. The full strength of the "down" corrective current will then flow from the feed-motor through the conductor 608, a conductor 617, a rectifier 618, a conductor 619, the fixed contact 512, the contact 513, and conductors 613 and 610 to the generator 590. If actual reversal of rotation has occurred, the contacts 512 and 513 will disengage and the "down" current must thereafter pass from the conductor 608 through the resistance 609 and the conductor 610 to the generator. Thus it is evident that the resistance 609 in the generator output circuit serves to diminish the corrective current flowing in either direction and consequently the torque only during the accelerating interval.

Braking is effected by plugging the feed-motor circuit in the present application rather than by the electromechanical application of a brake as was shown in the prior circuits. If we assume a condition wherein the tracer mechanism is calling for "down" travel and the rotation of the feed-motor is clockwise to satisfy the demand, the rotative force on the friction direction switch will maintain the contact 513 in engagement with the contact 511 and route the accelerating corrective current through the resistance 609 to complete the circuit. When the tracer stylus deflection is increased by this "down" travel, the "down" tracer contact is opened and the required correction is made. The "down" velocity at this instant however causes overtravel and the stylus is further deflected to close the tracer "up" contact. The following "up" torque tending toward reversal of the feed-motor rotation decelerates the existing "down" velocity and is the result of this reversed polarity corrective current flow from the generator brush 611 through the friction direction switch contacts 513 and 511 which are still engaged, the feed-motor armature 289 and field 305, and the rectifier 606 back to the generator. Thus the stronger decelerating corrective current by-passes the resistance 609 to flow through the switch 210 and the conductor 608 to the feed-motor and effect an electrical "plugging" of the motor until the contacts 511 and 513 are opened.

The "up" corrective current now becomes accelerating with reversed rotation because the tracer stylus is yet unsatisfied by the amount of "down" overtravel relative to the pattern. The continued corrective current now flowing through the resistance 609 to the feed-motor will cause the latter to gain rotating speed and begin an upward movement of the tracer attachment. The reversed rotation of the feed-motor has thus effected a closure between the movable contact 513 and the contact 512 in the friction direction switch 210. Thereafter the "up" polarity corrective current will flow from conductor 610 through resistance 609 and conductor 608 to the feed-motor while accelerating. A like sequence will occur during a change from an accelerating "up" current to an accelerating "down" current.

Thus it is evident that the resistance 609 serves as a maximum current weakening means whereby an "up" or "down" accelerating corrective current flowing through the resistance is weakened while an "up" or "down" decelerating corrective current by-passed through the friction direction switch 210 is not weakened. Therefore a decelerating corrective current energizing the feed-motor will produce a greater magnitude torque for deceleration than an accelerating corrective current will produce for acceleration. This means that the time rate of change of velocity decrease will always be greater than the time rate of change of velocity increase. That is to say, each succeeding increment of overtravel is diminished to damp out any tendency toward continued oscillation or hunting.

From the foregoing description of illustrative apparatus and control systems constituting exemplifying embodiments of the present invention, it will be apparent that there has been provided an improved control arrangement especially adapted for the operation of machine tools of the tracer controlled type.

Although the illustrative embodiments of the invention herein set forth have been described in detail to make a full disclosure of the invention, it is to be understood that the particular apparatus described is intended to be illustrative only and that the various features of the invention may be incorporated in other forms without departing from the spirit and scope of the invention, as defined in the subjoined claims.

The principles of the invention having now been fully explained as exemplified by the illustrated apparatus set forth in the foregoing description, I hereby claim as my invention and discovery:

1. In a tracer controlled machine tool having relatively movable work supporting and cutter supporting elements, an electric motor operatively connected to effect controlled relative movements of said elements, said motor having a field winding and an armature winding, a tracer mechanism arranged to respond to the controlling effect of a guiding pattern, an electric generator connected to be controlled by said tracer mechanism and operative to provide reversible-polarity electric current to said motor, conductor means arranged to connect said generator to said armature winding of said motor, and unidirectional current transmitting means arranged to connect said generator to said field winding in a manner to provide unidirectional current to said field winding, the arrangement being such that said motor operates in the one or the other direction in response to reversal of the polarity of current from said generator and thereby effects relative movements of said work supporting and cutter supporting elements in accordance with the requirements of the guiding pattern.

2. In a tracer controlled machine tool having relatively movable working elements, an electric motor operatively connected to one of said elements and operative thereon in a manner to effect relative movement of said elements, tracer mechanism operatively connected to and arranged to control said motor, a control system operatively connected to said tracer mechanism and to said motor and operating in a manner to control said motor in response to operation of said tracer mechanism, auxiliary control means connected to said control system and operative to modify the effect of said control system in response to said tracer mechanism, and adjusting means operatively connected to said auxiliary control means and constructed and arranged to cause it selectively to accentuate or to diminish the effect of said control system upon said motor.

3. In a tracer controlled machine tool, relatively movable cutter supporting and work supporting elements, power actuated means arranged to effect controlled relative movements of said supporting elements, a tracer mechanism arranged to respond to a guiding pattern and connected to said power actuated means in a manner operative to effect accelerating or decelerating actions of said power actuated means in accordance with the requirements of the pattern, and power controlling apparatus connected to said power actuated means and so constructed and arranged as to cause the decelerating actions of said power actuated means to be greater than the accelerating actions, whereby a damping effect is provided to prevent hunting.

4. A dimensional control system for a tracer type machine tool having a tracer operatively disposed for relative movement upon a pattern, a control means connected to said tracer and operative thereby to create a series of dimensional demands as dictated by said pattern, a movable element, a motor disposed to be operatively controlled by said demands and connected to effect controlled movement of said element, and checking control means connected to control said motor and constructed and arranged to check the movement of said element by said motor when each demand is satisfied and to be rendered inoperable directly thereafter to permit said control system to function according to the dictates of the succeeding demand.

5. In a tracer controlled machine tool, comprising feeding mechanism for effecting controlled cutting operations, tracer mechanism operatively connected to said feeding mechanism in a manner to control said mechanism for alternative acceleration or deceleration thereof, auxiliary control means responsive to changes in the rate of operation of said feeding mechanism and connected to said tracer mechanism in a manner to be operative to modify the effect of said tracer mechanism upon said feeding mechanism, and adjusting means for said auxiliary control means operatively connected thereto and constructed and arranged to change selectively the modifying action of said auxiliary control means upon said tracer mechanism to provide for alternatively increasing or decreasing the normal accelerating force.

6. In a tracer controlled machine tool, a driving motor, a tracer mechanism operatively connected to control said driving motor in accordance with the requirements of a pattern being traced, a brake mechanism associated with said driving motor and operative selectively to assist in decelerating said motor, a direction responsive switch connected to be driven by said motor and operative to control said brake in accordance with acceleration or deceleration of said motor, and lost motion mechanism associated with said brake mechanism and arranged to permit sufficient reverse movement of said motor free from resistance from said brake to effect operation of said direction responsive switch.

7. In a tracer controlled machine tool including relatively movable work supporting and cutter supporting elements, an electric motor operatively connected to effect relative movement of said elements, tracer mechanism operative to control said motor for effecting relative movements in accordance with a guiding pattern, an electrical circuit operatively connecting said tracer mechanism to said motor, an electrical resistance element associated with said motor circuit, an acceleration responsive switch means associated with said motor and operative to connect said resistance element into said motor circuit during acceleration only of said motor, whereby during deceleration of said motor the full effect of said tracer mechanism is available rapidly to reduce the speed of rotation while during acceleration the effect of said tracer mechanism is modified to obviate excessive movements and damp oscillations.

8. In a tracer controlled machine tool, the combination with relatively movable work supporting and cutter supporting elements and a driving motor operatively connected to effect relative movement between said elements, of a generator having a shunt field winding and a bucking control field winding said generator being electrically connected to energize said driving motor, control means including vibratory electrical contacts connected to control the energization of said bucking field winding, a tracer mechanism including a stylus adapted to cooperate with a guiding pattern, and means responsive to the pressure exerted upon said stylus by the pattern and operative to control the frequency of vibration of said vibratory electrical contacts, whereby the energization of said control field is regulated in manner to provide generator current for operating said motor in the direction and at the speed required to effect relative movement between said work and cutter supporting elements in accordance with the requirements of the pattern being followed.

9. In a tracer controlled machine tool, work supporting and cutter supporting elements arranged for cooperating relative movement, an electric motor operatively connected to effect relative movement of said elements, a tracer system operative to cause said motor to accelerate or decelerate in the one or the other direction as may be required to effect movement of said supports in accordance with a pattern, an electrically operated brake associated with said motor, and an electrical control system responsive to operation of said tracer system in causing deceleration of said motor and operative to apply said electrically operated brake in proportion to the decelerating effect of said tracer system to amplify the decelerating action.

10. In a pattern controlled machine tool including a cutter support and a work support, power driven means arranged to effect relative movement of said supports, a tracer mechanism operatively connected to said power driven means in a manner to control it in accordance with the contour of a pattern being copied, said power driven means including means to effect acceleration of said relative movement or deceleration thereof selectively, and control apparatus operatively connected to control said power driven means, said control apparatus being so constructed and arranged that said deceleration action is greater than said acceleration action to provide an anti-hunting effect.

11. In a tracer controlled machine tool, relatively movable cooperating work and cutter supporting elements arranged to operate upon a work piece, a tracer mechanism disposed to cooperate with a pattern, force exerting mechanism operatively connected to said work and cutter supporting elements and to said tracer mechanism in a manner arranged to effect relative movement between said work and cutter supporting elements and between said tracer and the cooperating pattern, and control means responsive to operation of said tracer mechanism in cooperating with said pattern and connected to said force exerting mechanism in a manner to effect accelerating or decelerating action of said force exerting mechanism, said control means being so constructed and arranged that the decelerating force thus exerted is greater than the accelerating force, whereby any tendency of said force exerting mechanism to effect a continuing oscillation is damped out.

12. In a tracer controlled machine tool including a cutter supporting element, power operated means arranged to effect relative movement between said cutter supporting element and a work piece, a tracer mechanism operatively connected to control said power operated means, a brake selectively engageable to oppose said relative movement, and electrical control means operative to release said brake upon reversal of the direction of said relative movement including a switch and a lost motion connection between said brake and said power operated means arranged to permit limited movement upon reversal for actuating said switch.

13. In a tracer controlled machine tool including relatively movable cutter supporting and work supporting elements, a reversible electric motor operatively connected to effect relative movement between said elements in either direction selectively, a tracer mechanism arranged to cooperate with a guiding pattern and operative to reverse said motor in causing said relative movement to follow the requirements of the pattern, a brake associated with said motor, a brake engaging means, and means responsive to the direction of relative movement to condition said brake engaging means for operation to engage said brake upon plugging reversal of said motor.

14. In a tracer controlled machine tool, a tracer mechanism including relatively movable condenser plates, electronic tubes operatively connected to be influenced by changes in capacity between said condenser plates in response to actuation of said tracer mechanism by a pattern being copied, an amplifier unit connected to receive actuating current from said tubes, an electric generator having field windings connected to be energized by amplified currents from said amplifier, and a spindle feeding motor operatively connected to receive energizing current from said generator and operative to effect feeding movements in accordance with the operation of said tracer over a pattern being followed, the motor energizing current being the amplified counterpart of the current flowing to the electronic tubes under the control of the tracer actuated condenser plates.

15. In a copying machine including a tracer and a pattern, the combination of supports relatively movable for relative movement of said tracer and pattern in either of opposite directions, said tracer including a stylus contacting said pattern and movable relative to a neutral position in accordance with said support movements, means for effecting electric currents having instant magnitude and direction determined respectively by the instant amount and direction of stylus displacement from said neutral position, means for transforming movements of said stylus into electric impulses having instant magnitude determined by the instant rate of stylus movement and having alternative directions determined jointly by the instant position of the stylus relative to said neutral position and by the instant direction of stylus movement toward or from said neutral position, power actuated means operable for said support movements at various rates, controlling means for said power actuated means and simultaneously subject to the control both of said electric currents and of said electric impulses, and supplemental control means including switch means adjustable for selectively reversing the direction of said impulses as applied to said controlling means.

16. In a copying machine including a tracer and a pattern, the combination of supports relatively movable for relative movement of said tracer and pattern in either of opposite directions, said tracer including a stylus contacting said pattern and movable relative to a neutral position in accordance with said support movements, means for effecting electric currents having instant magnitude and direction determined respectively by the amount and direction of stylus displacement from said neutral position, means for transforming said stylus movements into electric impulses having instant magnitude determined by the instant rate of stylus movement and having alternative directions determined by the movement of said stylus toward or from said neutral position, other means for transforming said stylus movements into electric impulses having instant magnitude determined by the instant rate of stylus movement and having alternative directions determined jointly by the instant position of the stylus relative to said neutral position and by the instant direction of stylus movement toward or from said neutral position, switch means adjustable for selectively rendering the one or the other of said transforming means operative, power actuated means for said support movements, and controlling means for said power actuated means simultaneously subject to the control of said electric currents and of the electric impulses from the one or the other of said transforming means as determined by the adjustment of said switch means.

17. In a copying machine including a tracer and a pattern, the combination of two supports relatively movable for relative movement of said tracer and pattern in either of opposite directions, said tracer including a stylus contacting said pattern and movable relative to a neutral position in accordance with said support movements, means for effecting a copying force having instant magnitude and direction determined respectively by the instant amount and direction of stylus displacement from said neutral position, means for transforming movements of said stylus into force impulses having instant magnitude determined by the instant rate of stylus movement and having alternative directions determined jointly by the instant position of the stylus relative to said neutral position and by the instant direction of stylus movement toward or from said neutral position, power operable means connected to be actuated simultaneously from said copying force and from said force impulses, and supplemental control means adjustable for selectively reversing the direction of operation of said force impulses on said power means.

18. In a copying machine including a tracer and a pattern, the combination of two supports relatively movable for relative movement of said tracer and pattern in either of opposite directions, said tracer including a stylus contacting said pattern and movable relative to a neutral position in accordance with said support movements, means for effecting a copying force having instant magnitude and direction determined respectively by the instant amount and direction of stylus displacement from said neutral position, means for transforming movements of said stylus into force impulses having instant magnitude determined by the instant rate of stylus movement and having alternative directions determined by the movement of said stylus toward or from said neutral position, other means for transforming movements of said stylus into force impulses having instant magnitude determined by the instant rate of stylus movement and having alternative directions determined jointly by the instant position of the stylus relative to said neutral position and by the instant direction of stylus movement toward or from said neutral position, control means adjustable for selectively rendering the one or the other of said transforming means operative, and power operable means connected for effecting said support movements and connected to be actuated from said copying force and simultaneously from the force impulses of one of said transforming means in accordance with the adjustment of said control means.

19. In a copying machine including a tracer and a pattern, the combination of two supports relatively movable for relative movement of said tracer and pattern in either of opposite directions, said tracer having a stylus contacting said pattern and movable relative to a neutral position in accordance with said support movements, means for effecting a copying force having instant magnitude and direction determined respectively by the instant amount and direction of stylus displacement from said neutral position, power operable means connected for said support movements and connected for operation by said copying force to effect acceleration or deceleration of the movement in accordance with the instant requirements of the pattern, and control means operatively supplementing said copying force to cause the decelerating actions of said power operable means to be greater than the accelerating actions, whereby to effect a damping action to reduce hunting.

20. In a copying machine including a tracer and a pattern, the combination of two supports relatively movable for relative movement of said tracer and pattern in either of opposite directions, said tracer having a stylus contacting said pattern and movable relative to a neutral position in accordance with said support movements, means for effecting a copying force having instant magnitude and direction determined respectively by the instant amount and direction of stylus displacement from said neutral position, power operable means connected for said support movements and connected for operation by said copying force to effect acceleration or deceleration of the movement in accordance with the instant requirements of the pattern, and control means operatively supplementing said copying force to cause the decelerating actions of said power operable means to be greater than the acceleration actions, whereby to effect a damping action to reduce hunting, said control means including a brake device associated with said supports and brake operating means responsive to change of rate of movement of said supports.

21. In a copying machine including a tracer and a pattern, the combination of two supports relatively movable for relative movement of said tracer and pattern in either of opposite directions, said tracer having a stylus contacting said pattern and movable relative to a neutral position in accordance with said support movements, means for effecting a copying force having instant magnitude and direction determined respectively by the instant amount and direction of stylus displacement for said neutral position, power operable means connected for said support movements and connected for operation by said copying force to effect acceleration or deceleration of the movement in accordance with the instant requirements of the pattern, and control means operatively supplementing said copying force to cause the decelerating actions of said power operable means to be greater than the accelerating actions, whereby to effect a damping action to reduce hunting, said control means including a brake device associated with said supports and brake operating means simultaneously responsive to changes of both rate and direction of support movement.

22. In a copying machine including a tracer and a pattern, the combination of two supports relatively movable for relative movement of said tracer and pattern in either of opposite directions, said tracer including a stylus contacting said pattern and movable relative to a neutral position in accordance with said support movements, means for effecting a copying force having instant magnitude and direction determined respectively by the instant amount and direction of stylus displacement from said neutral position, means for transforming movements of said stylus into force impulses having instant magnitude determined by the instant rate of stylus movement and having alternative directions determined jointly by the instant position of the stylus relative to said neutral position and by the instant direction of stylus movement toward or from said neutral position, power operable means connected for effecting said support movements and connected to be actuated simultaneously from said copying force and from said force impulses, whereby to effect acceleration or deceleration of the support movements in accordance with the requirements of said pattern, and control means associated with said supports and operative to cause the decelerating actions of said power operable means to be greater than the accelerating actions to reduce hunting.

23. In a copying machine including a tracer and a pattern, the combination of two supports relatively movable for relative movement of said tracer and pattern in either of opposite directions, said tracer including a stylus contacting said pattern and movable relative to a neutral position in accordance with said support movements, means for effecting a copying force having instant magnitude and direction determined respectively by the instant amount and direction of stylus displacement from said neutral position, means for transforming movements of said stylus into force impulses having instant magnitude determined by the instant rate of stylus movement and having alternative directions determined jointly by the instant position of the stylus relative to said neutral position and by the instant direction of stylus movement toward or from said neutral position, power operable means connected for effecting said support movements and connected to be actuated simultaneously from said copying force and from said force impulses, whereby to effect acceleration or deceleration of the support movements in accordance with the requirements of said pattern, and control means associated with said supports and operative to cause the decelerating actions of said power operable means to be greater than the accelerating action to reduce hunting, said control means including a brake device and brake operating means responsive to changes of rate of support movement.

24. In a copying machine including a tracer and a pattern, the combination of two supports relatively movable for relative movement of said tracer and pattern in either of opposite directions, said tracer having a stylus contacting said pattern and movable in either direction from a neutral position in accordance with said support movements, an electric generator controlled in accordance with the movements of said stylus to provide electric current of instant magnitude and direction determined respectively by the instant amount and direction of stylus displacement from said neutral position, an electric motor for said support movements including a field winding and an armature winding, and connections from said generator for both said motor windings to receive current from said generator, including current rectifier means effective for uni-directional current to one only of said windings.

25. In a copying machine including a tracer and a pattern, the combination of two supports respectively movable in mutually transverse in-out and line paths for said tracer to follow the pattern configuration, said tracer having a stylus contacting said pattern and movable in either direction from a neutral position in accordance with the support movements in said in-out path, two electric motors respectively for the actuation of the in-out and line supports, each of said motors including a field winding and an armature winding, an electric generator controlled in accordance with the movements of said tracer stylus to provide electric current of instant magnitude and direction determined respectively by the instant amount and direction of stylus displacement from said neutral position, connections from said generator to the motor of said in-out support for both said windings thereof to receive current from the generator including uni-directional current transmitting means for one of said windings, and connections from said generator to the motor of said line support for at least one of said windings thereof to receive current from said generator through said uni-directional current transmitting means.

THEODORE A. WETZEL.

REFERENCES CITED

The following references are of record in the file of this patent:

UNITED STATES PATENTS

| Number | Name | Date |
|---|---|---|
| 1,703,280 | Minorsky | Feb. 28, 1929 |
| 1,784,504 | Tanner | Dec. 9, 1930 |
| 1,785,490 | Merrill | Dec. 16, 1930 |
| 1,988,458 | Minorsky | Jan. 22, 1935 |
| 1,998,939 | Mittag | Apr. 23, 1935 |
| 2,016,857 | Fische | Oct. 8, 1935 |
| 2,025,748 | Howe | Dec. 31, 1935 |
| 2,068,490 | Hull | Jan. 19, 1937 |
| 2,068,577 | Stratton | Jan. 19, 1937 |
| 2,085,442 | Newell | June 29, 1937 |
| 2,112,682 | Ryder | Mar. 29, 1938 |
| 2,116,593 | Bouvier | May 10, 1938 |
| 2,162,491 | Rosen | June 13, 1939 |
| 2,167,850 | Phillips | Aug. 1, 1939 |
| 2,228,902 | Allen | Jan. 14, 1941 |
| 2,234,775 | Parsons | Mar. 11, 1941 |
| 2,240,637 | Cook | May 6, 1941 |
| 2,245,894 | Arms | June 17, 1941 |
| 2,250,241 | Thalmann | July 22, 1941 |
| 2,263,764 | Elberty | Nov. 25, 1941 |
| 2,287,876 | Haight | June 30, 1942 |
| 2,290,589 | Steinmuller | July 21, 1942 |
| 2,307,503 | Gulliksen | Jan. 5, 1943 |
| 2,318,938 | Hack | May 11, 1943 |
| 2,335,304 | Parsons | Nov. 30, 1943 |
| 2,345,116 | Hanna | Mar. 28, 1944 |
| 2,365,558 | King | Dec. 19, 1944 |
| 2,372,604 | Rosen | Mar. 27, 1945 |

FOREIGN PATENTS

| Number | Country | Date |
|---|---|---|
| 489,271 | Great Britain | July 22, 1938 |
| 505,470 | Great Britain | May 11, 1939 |
| 552,415 | Great Britain | Apr. 17, 1943 |
| 560,045 | Germany | Sept. 28, 1932 |

OTHER REFERENCES

Publication, Westinghouse Engineer, May 1945, pub. by Westinghouse Engineer, 306–4th Avenue, P. O. Box 1017, Pittsburgh 30, Pennsylvania.